US008532582B2

(12) United States Patent
Nakazawa

(10) Patent No.: US 8,532,582 B2
(45) Date of Patent: Sep. 10, 2013

(54) METHOD FOR CONTROLLING COMMUNICATION, COMMUNICATION SYSTEM, AND COMMUNICATION APPARATUS

(75) Inventor: Hitoshi Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 12/775,778

(22) Filed: May 7, 2010

(65) Prior Publication Data

US 2010/0285756 A1 Nov. 11, 2010

(30) Foreign Application Priority Data

May 8, 2009 (JP) ................................ 2009-113954

(51) Int. Cl.
*H04B 1/00* (2006.01)
*H04B 7/00* (2006.01)

(52) U.S. Cl.
USPC ........................................................ 455/69

(58) Field of Classification Search
USPC .................................... 455/69, 67.11, 68, 39
See application file for complete search history.

(56) References Cited

U.S. PATENT DOCUMENTS

| | | | |
|---|---|---|---|
| 5,673,254 | A | 9/1997 | Crayford |
| 5,784,559 | A | 7/1998 | Frazier et al. |
| 6,584,535 | B1 | 6/2003 | Ouellet et al. |
| 7,031,258 | B1 | 4/2006 | Frisch et al. |
| 7,769,257 | B2 | 8/2010 | Kikuchi et al. |
| 7,814,223 | B2 | 10/2010 | Arita et al. |
| 2003/0016628 | A1 | 1/2003 | Kadambi et al. |
| 2005/0182848 | A1 | 8/2005 | McNeil, Jr. et al. |
| 2008/0192631 | A1 | 8/2008 | Ardhanari et al. |
| 2008/0205430 | A1 | 8/2008 | Matsui |
| 2011/0032910 | A1 | 2/2011 | Aarflot et al. |

FOREIGN PATENT DOCUMENTS

| | | |
|---|---|---|
| JP | 10-013441 | 1/1998 |
| JP | 11-506288 | 6/1999 |
| JP | 2000-330961 | 11/2000 |
| JP | 2000-349768 | 12/2000 |
| JP | 2002-152282 | 5/2002 |
| JP | 2003-158523 | 5/2003 |
| JP | 2006-180279 | 7/2006 |
| JP | 2008-516503 | 5/2008 |
| JP | 2005-198302 | 7/2008 |
| JP | 2009-55212 | 3/2009 |

(Continued)

OTHER PUBLICATIONS

European Search Report, dated Oct. 25, 2010, from the corresponding Application No. EP 10 16 2212.

(Continued)

*Primary Examiner* — Eugene Yun
(74) *Attorney, Agent, or Firm* — Katten Muchin Rosenman LLP

(57) ABSTRACT

A first communication device determines whether a remaining amount of a buffer that stores therein information included in reception data is equal to or less than a predetermined amount, and inserts, upon being determined that the remaining amount of the buffer is equal to or less than the predetermined amount, a transmission control signal for controlling data transmission performed by a second communication device into an idle section of data transmitted to the second communication device. The data includes a data section with information and the idle section without information. The data into which the transmission control signal is inserted is transmitted to the second communication device. The second communication device receiving the data, detects the transmission control signal in the idle section of the data and controls the data transmission based on the detected transmission control signal.

6 Claims, 23 Drawing Sheets

(56) References Cited

FOREIGN PATENT DOCUMENTS

| | | |
|---|---|---|
| WO | 96/41455 | 12/1996 |
| WO | 2006/011225 | 2/2006 |
| WO | 2006/040653 | 4/2006 |

OTHER PUBLICATIONS

CPRI Specification V2.1 Common Public Radio Interface (CPRI); Interface Specification, Mar. 31, 2006.

Communication pursuant to Article 94(3) EPC dated Mar. 27, 2012, from corresponding European Application No. 10 162 212.4-1249.

European Search Report dated Jul. 30, 2010, from the corresponding European Application.

Notice of Rejection dated Nov. 27, 2012, from corresponding Japanese Application No. 2009-113954.

Japanese Office Action dated Jun. 4, 2013 from corresponding Japanese Patent Application 2009-113954 with full translation of the Office Action.

FIG.23

| SUB-CHANNEL NUMBER (Ns) | OBJECT | CONTROL WORD NUMBER (Xs) | | | |
|---|---|---|---|---|---|
| | | Xs=0 | Xs=1 | Xs=2 | Xs=3 |
| 0 | sync&timing | sync byte K28.5 | HFN | BFN-low | BFN-high |
| 1 | slow C&M | slow C&M | slow C&M | slow C&M | slow C&M |
| 2 | L1 inband prot. | version | startup | L1-reset-LOS... | pointer p |
| 3 | reserved | reserved | reserved | reserved | reserved |
| ... | ... | ... | ... | ... | ... |
| 15 | reserved | reserved | reserved | reserved | reserved |
| 16 | vendor specific | vendor specific | vendor specific | vendor specific | vendor specific |
| ... | ... | ... | ... | ... | ... |
| p-1 | vendor specific | vendor specific | vendor specific | vendor specific | vendor specific |
| p | fast C&M | fast C&M | fast C&M | fast C&M | fast C&M |
| ... | ... | ... | ... | ... | ... |
| 63 | fast C&M | fast C&M | fast C&M | fast C&M | fast C&M |

METHOD FOR CONTROLLING COMMUNICATION, COMMUNICATION SYSTEM, AND COMMUNICATION APPARATUS

CROSS-REFERENCE TO RELATED APPLICATION

This application is based upon and claims the benefit of priority of the prior Japanese Patent Application No. 2009-113954, filed on May 8, 2009, the entire contents of which are incorporated herein by reference.

FIELD

The embodiments discussed herein are directed to a method for controlling communication, a communication system, and a communication apparatus.

BACKGROUND

In general, in mobile communication systems, a plurality of cells adjacent to each other is formed, and for example, a mobile terminal in each of the cells such as a cellular phone performs wireless communication with a radio base station device installed in the center of the cell. Accordingly, the service area is expanded by installing a new radio base station device and forming a new cell. However, it is very expensive to install a radio base station device. For example, various costs such as costs for manufacturing or purchasing a radio base station device, costs for obtaining land on which the radio base station device is established, and costs for supplying operational power, are required to install the radio base station device.

To reduce these costs, in recent years, a method of individually installing a radio unit of a radio base station device as a separate body has been studied. In other words, it has been studied that a portion corresponding to the radio unit of the radio base station device is separated as a remote radio head (RRH) equipped base station device and the service area is expanded by installing a new RRH-equipped base station device instead of the radio base station device. Because the RRH-equipped base station device is smaller and consumes lower power than the radio base station device, it is possible to install the RRH-equipped base station device at a relatively low cost.

By using such an RRH-equipped base station device, a service area may be established along a narrow area such as a highway at a low cost. In other words, a service area that covers the entire narrow area can be effectively established, by connecting one base station device that is a master station and a plurality of RRH-equipped base station devices that is slave stations in cascade through an optical cable. Accordingly, each of the RRH-equipped base station devices connected in cascade performs wireless communication with a mobile terminal, and performs wired communication with the base station device, which is a master station, through an optical cable (see, for example, Japanese Laid-open Patent Publication No. 2000-349768).

A structure of connecting the RRH-equipped base station devices in cascade in this manner is also proposed, for example, in a common specification called a Common Public Radio Interface (CPRI) (see, for example, CPRI Specification V2. 1, "Common Public Radio Interface (CPRI); Interface Specification" Mar. 31, 2006). The RRH-equipped base station device proposed in the CPRI and the like also transfers data exchanged between the base station device and the other RRH-equipped base station device. For example, in the downlink from a base station device to an RRH-equipped base station device, each of the RRH-equipped base station devices provided between the base station device and the transmission destination RRH-equipped base station device transfers data to the adjacent RRH-equipped base station device from one to another. Eventually, the data is transferred to the transmission destination RRH-equipped base station device. Similarly, in the uplink from the RRH-equipped base station device to the base station device, each of the RRH-equipped base station devices provided between a transmission source RRH-equipped base station device and the base station device transfers data to the adjacent RRH-equipped base station device from one to another. Eventually, the data is transferred to the base station device.

In general, in the downlink communication in such a cascade structure, a data transmission source is always one master station (such as a base station device). However, in the uplink communication, the data transmission source may be a plurality of slave stations (such as RRH-equipped base station devices). Accordingly, in the uplink, each of the slave stations can only transmit a limited amount of data. In other words, in the uplink, each of the slave stations is not allowed to occupy the entire band to transmit data. Consequently, for example, a band available for transmitting data is equally assigned to each slave station (see, for example, Japanese Laid-open Patent Publication No. 2006-180279).

As described above, in the uplink in which one master station and a plurality of slave stations are connected in cascade, if one of the slave stations occupy the entire band, the other slave stations are not allowed to transmit data. Accordingly, a band is equally assigned to each of the slave stations, and the slave station transmits data by using the band assigned to the slave station. For example, if five slave stations are connected to one master station in cascade, and if the entire uplink band is 100 megabits per second, a band of 20 megabits per second is assigned to each of the slave stations. To transmit data to the master station, the slave station transmits data by using the band of 20 megabits per second assigned to the slave station. Accordingly, all the slave stations can transmit data equally.

However, when a band is equally assigned to the slave stations connected in cascade, if any one of the slave stations is not transmitting data, the band is not effectively used. In other words, in the above example, for example, if only one slave station is transmitting data to the master station, even if data can be transmitted in the band of 100 megabits per second, only the band of 20 megabits per second is used. Accordingly, the remaining band of 80 megabits per second is wasted.

Similarly, even if all the slave stations are transmitting data, if the amount of data transmitted from any one of the slave stations is small, the slave station may not use the entire assigned band. Accordingly, the band is wasted. If the amount of data to be transmitted to the master station varies among the slave stations, the slave station that transmits a large amount of data can only transmit data within the assigned band, even if unoccupied band is available in the entire line. As a result, the time in which all the slave stations complete data transmission is delayed, thereby lowering the throughput.

SUMMARY

According to an aspect of an embodiment of the invention, a method for controlling communication includes: determining in which a first communication device determines whether a remaining amount of a buffer that stores therein information included in reception data is equal to or less than a predetermined amount; inserting, upon being determined that the remaining amount of the buffer is equal to or less than the predetermined amount at the determining, a transmission control signal for controlling data transmission performed by a second communication device into an idle section of data transmitted to the second communication device, the data including a data section with information and the idle section without information; transmitting the data into which the transmission control signal is inserted at the inserting to the second communication device; receiving in which the second communication device receives the data transmitted at the transmitting; detecting the transmission control signal in the idle section of the data received at the receiving; and controlling the data transmission based on the transmission control signal detected at the detecting.

According to another aspect of an embodiment of the invention, a method for controlling communication includes: determining in which a first communication device determines whether transmission information is newly transmitted from the first communication device; inserting, upon being determined that the transmission information is present at the determining, a transmission control signal for controlling data transmission performed by a second communication device into an idle section of data transmitted to the second communication device, the data including a data section with information and an idle section without information; transmitting data into which the transmission control signal is inserted at the inserting to the second communication device; receiving in which the second communication device receives the data transmitted at the transmitting; detecting the transmission control signal in the idle section of the data received at the receiving; and controlling data transmission based on the transmission control signal detected at the detecting.

According to still another aspect of an embodiment of the invention, a communication apparatus includes: a determining unit that determines whether a remaining amount of a buffer for storing therein information included in reception data is equal to or less than a predetermined amount; an inserting unit that, when the determining unit determines that the remaining amount of the buffer is equal to or less than the predetermined amount, inserts a transmission control signal for controlling data transmission performed by other communication apparatus connected to the communication apparatus into an idle section without information provided in data transmitted to the other communication apparatus; and a transmitting unit that transmits data into which the transmission control signal is inserted by the inserting unit to the other communication apparatus.

According to still another aspect of an embodiment of the invention, a communication apparatus includes: a determining unit that determines whether transmission information is newly transmitted from the communication apparatus; an inserting unit that, when the determining unit determines that the transmission information is present, inserts a transmission control signal for controlling data transmission performed by other communication apparatus connected to the communication apparatus into an idle section without information provided in data transmitted to the other communication apparatus; and a transmitting unit that transmits the data into which the transmission control signal is inserted by the inserting unit to the other communication apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 23 is a table of examples of sub-channel structures.

DESCRIPTION OF EMBODIMENT(S)

[a] First Embodiment

Configuration of Communication System

Figure 1:
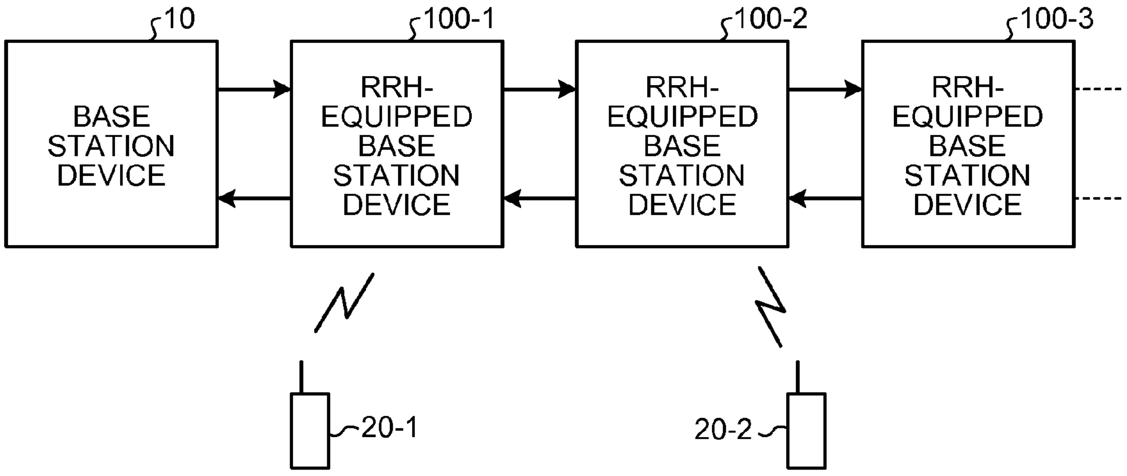
FIG. 1 is a schematic of a communication system according to a first embodiment.

FIG. 1 is a schematic of a communication system according to a first embodiment. In the communication system depicted in FIG. 1, a base station device 10 and remote radio head (RRH) equipped base station devices 100-1 to 100-3 are connected in cascade. Mobile terminals 20-1 and 20-2 are located in cells with which the RRH-equipped base station devices 100-1 and 100-2 are capable of wireless communication.

The base station device 10 transmits control data for controlling the RRH-equipped base station devices 100-1 to 100-3, data (for example, user data) addressed to the mobile terminals 20-1 and 20-2, or the like, to the RRH-equipped base station device 100-1. The base station device 10 also receives report data for reporting the states of the RRH-equipped base station devices 100-1 to 100-3, data transmitted from the mobile terminals 20-1 and 20-2, or the like, from the RRH-equipped base station device 100-1. In the following, data transmitted in downlink in the direction away from the base station device 10 is called downlink data, and data transmitted in uplink in the direction towards the base station device 10 is called uplink data. Each of the downlink data and the uplink data has a frame section (may be referred to as "data section") including a frame and an idle section not including a frame. A device connected to the RRH-equipped base station device at the side away from the base station device 10 is called a lower-level device, and a device connected to the RRH-equipped base station device at the side close to the base station device 10 is called a higher-level device.

The mobile terminal 20-1 is under the charge of the RRH-equipped base station device 100-1, and receives data from the RRH-equipped base station device 100-1, and transmits data to the RRH-equipped base station device 100-1. Similarly, the mobile terminal 20-2 is under the charge of the RRH-equipped base station device 100-2, and receives data from the RRH-equipped base station device 100-2, and transmits data to the RRH-equipped base station device 100-2.

The RRH-equipped base station device 100-1 receives downlink data transmitted from the base station device 10, and transfers a frame (hereinafter, referred to as "downlink frame") included in the downlink data to the RRH-equipped base station device 100-2. The RRH-equipped base station device 100-1 also obtains data addressed to the mobile terminal 20-1 in the downlink frame. The RRH-equipped base station device 100-1 then wirelessly transmits the obtained data to the mobile terminal 20-1. The RRH-equipped base station device 100-1 also receives data transmitted from the mobile terminal 20-1.

The RRH-equipped base station device 100-1 further receives uplink data transmitted from the RRH-equipped base station device 100-2, and transfers a frame (hereinafter, referred to as "uplink frame") included in the uplink data to the base station device 10. The RRH-equipped base station device 100-1 also transmits an uplink frame including report data for reporting the state of the RRH-equipped base station device 100-1, data received from the mobile terminal 20-1, or the like, to the base station device 10. At this time, the RRH-equipped base station device 100-1 has a buffer for temporarily storing the uplink frame therein. If the remaining amount of the buffer is equal to or less than a predetermined amount, the RRH-equipped base station device 100-1 inserts a stop code for stopping the transmission of uplink frames into downlink data, and transmits the stop code to the RRH-equipped base station device 100-2. If the remaining amount of the buffer that can store an uplink frame therein is equal to or more than a predetermined amount, the RRH-equipped base station device 100-1 inserts a cancel code for cancelling the stopped transmission of uplink frames into downlink data, and transmits the cancel code to the RRH-equipped base station device 100-2.

Upon inserting the stop code or the cancel code into the downlink data, the RRH-equipped base station device 100-1 inserts the stop code or the cancel code into an idle section provided between two frame sections, instead of the frame section (may be referred to "data section") with meaningful information, such as control data and user data. The idle section does not have meaningful information during normal time, while the stop code or the cancel code is not inserted, and is a section provided to identify the boundary between two frame sections. A configuration and operation of the RRH-equipped base station device 100-1 will be explained later.

The RRH-equipped base station device 100-2 receives downlink data transmitted from the RRH-equipped base station device 100-1, and transfers a downlink frame to the RRH-equipped base station device 100-3. At the same time, the RRH-equipped base station device 100-2 obtains data addressed to the mobile terminal 20-2 in the downlink frame, and wirelessly transmits the obtained data to the mobile terminal 20-2. The RRH-equipped base station device 100-2 also receives data transmitted from the mobile terminal 20-2.

The RRH-equipped base station device 100-2 receives an uplink data transmitted from the RRH-equipped base station device 100-3, and transfers an uplink frame to the RRH-equipped base station device 100-1. The RRH-equipped base station device 100-2 transmits an uplink frame including report data for reporting the state of the RRH-equipped base station device 100-2, data received from the mobile terminal 20-2, or the like, to the RRH-equipped base station device 100-1. However, upon detecting a stop code in the downlink data, the RRH-equipped base station device 100-2 stops transmitting uplink frames to the RRH-equipped base station device 100-1. Upon detecting a cancel code in the downlink data afterwards, the RRH-equipped base station device 100-2 resumes transmitting uplink frames to the RRH-equipped base station device 100-1. A configuration and operation of the RRH-equipped base station device 100-2 will be explained later.

Similar to the RRH-equipped base station device 100-1, the RRH-equipped base station device 100-2 has a buffer for temporarily storing an uplink frame therein. If the remaining amount of the buffer that can store the uplink frame therein is equal to or less than a predetermined amount, the RRH-equipped base station device 100-2 inserts a stop code into downlink data and transmits the stop code to the RRH-equipped base station device 100-3. If the remaining amount of the buffer that can store the uplink frame therein is equal to or more than a predetermined amount, the RRH-equipped base station device 100-2 inserts a cancel code into downlink data and transmits the cancel code to the RRH-equipped base station device 100-3. The RRH-equipped base station device 100-3 operates the same as the RRH-equipped base station devices 100-1 and 100-2.

Configuration of RRH-Equipped Base Station Device

Figure 2:
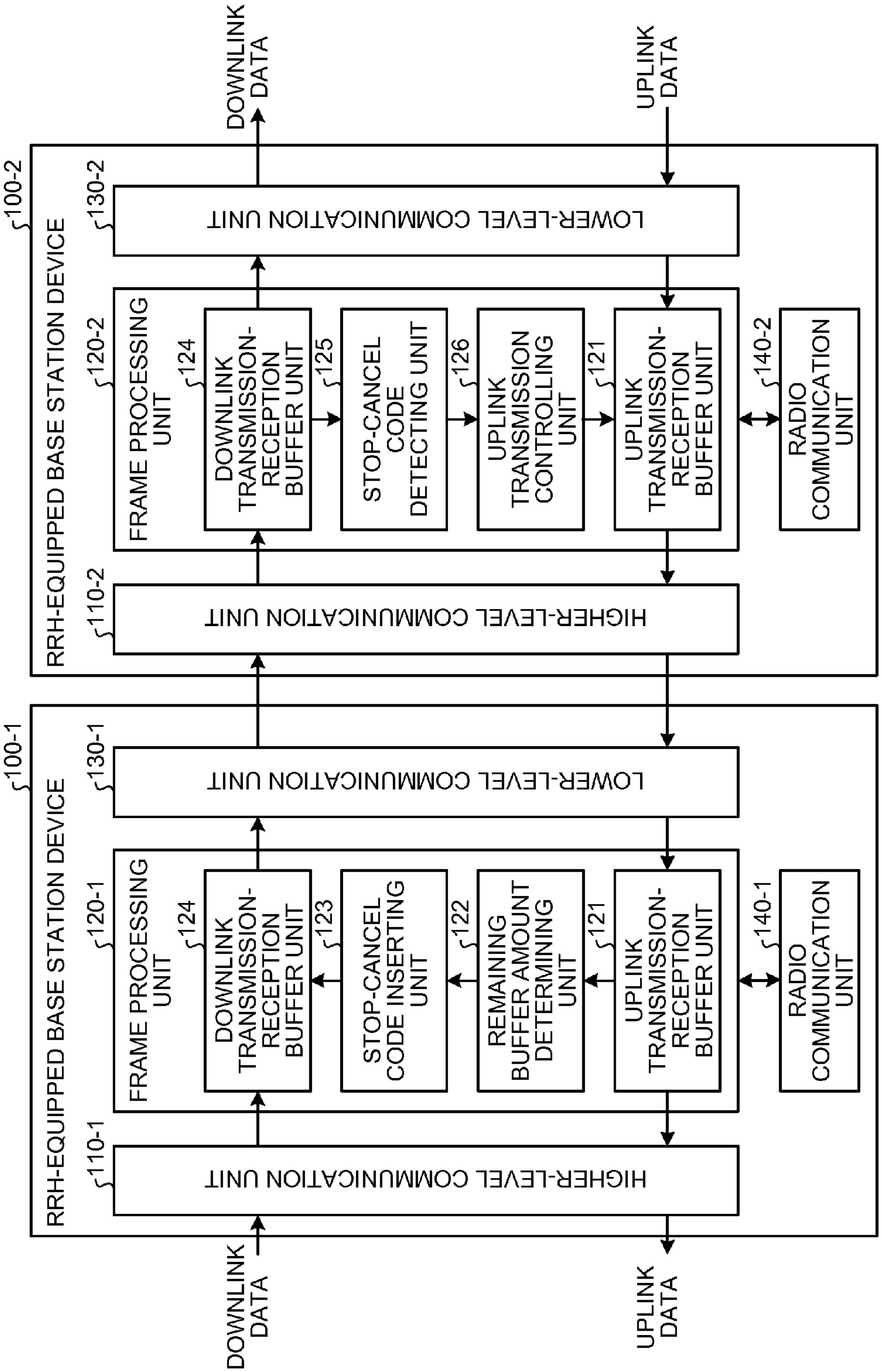
FIG. 2 is a schematic of RRH-equipped base station devices according to the first embodiment.

FIG. 2 is a schematic of the RRH-equipped base station devices 100-1 and 100-2 according to the present embodiment. In FIG. 2, processing units related to communication between the RRH-equipped base station device 100-1 and the RRH-equipped base station device 100-2 are mainly depicted, and the other processing units are not depicted. In other words, in practice, the RRH-equipped base station devices 100-1 and 100-2 have the same device structure. The RRH-equipped base station device 100-3 depicted in FIG. 1 also has the same device structure as those of the RRH-equipped base station devices 100-1 and 100-2.

The RRH-equipped base station device 100-1 depicted in FIG. 2 includes a higher-level communication unit 110-1, a frame processing unit 120-1, a lower-level communication unit 130-1, and a radio communication unit 140-1.

The higher-level communication unit 110-1 communicates with the base station device 10 that is a higher-level device. In other words, the higher-level communication unit 110-1 receives downlink data transmitted from the base station device 10, and transmits uplink data to the base station device 10.

The frame processing unit 120-1 transfers the received uplink data and downlink data, or obtains data addressed to the mobile terminal 20-1 under the charge of the RRH-equipped base station device 100-1, in the downlink frame. The frame processing unit 120-1 then outputs data addressed to the mobile terminal 20-1 to the radio communication unit 140-1. The frame processing unit 120-1 also outputs data output from the radio communication unit 140-1 to the higher-level communication unit 110-1 as an uplink frame.

Depending on the remaining amount of the buffer that stores therein an uplink frame, the frame processing unit 120-1 inserts a transmission control code for controlling the uplink communication in the RRH-equipped base station device 100-2, into downlink data. For example, the frame processing unit 120-1 includes an uplink transmission-reception buffer unit 121, a remaining buffer amount determining unit 122, a stop-cancel code inserting unit 123, and a downlink transmission-reception buffer unit 124.

The uplink transmission-reception buffer unit 121 temporarily stores therein uplink frames. In other words, the uplink transmission-reception buffer unit 121 includes a transmission buffer and a reception buffer. The transmission buffer stores therein an uplink frame newly transmitted from the RRH-equipped base station device 100-1, and the reception buffer stores therein an uplink frame received from the lower-level device.

Figure 3:
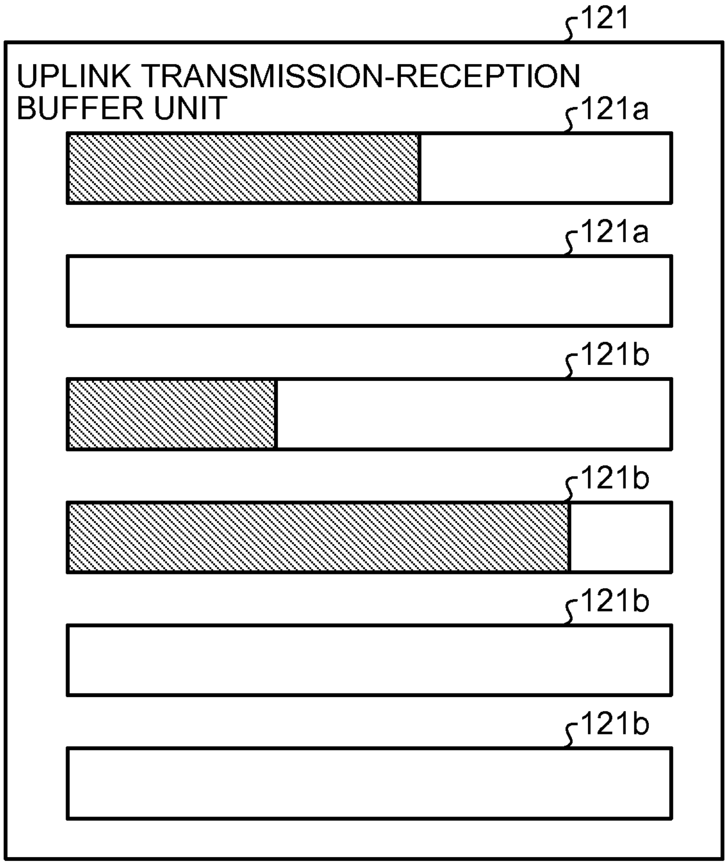
FIG. 3 is a schematic of an uplink transmission-reception buffer unit according to the first embodiment.

For example, as depicted in FIG. 3, the uplink transmission-reception buffer unit 121 includes two transmission buffers 121*a* and four reception buffers 121*b*. As depicted in FIG. 3 by the diagonal lines, an uplink frame is stored in each of the buffers. Accordingly, the sizes of the transmission buffers 121*a* and the reception buffers 121*b* are at least equal to or larger than the maximum size of a frame.

Each of the transmission buffers 121*a* stores therein an uplink frame including report data for reporting the state of the RRH-equipped base station device, data from the mobile terminal under the charge of the RRH-equipped base station device, and the like. In other words, each of the transmission buffers 121*a* of the RRH-equipped base station device 100-1 stores therein an uplink frame newly transmitted from the RRH-equipped base station device 100-1, such as report data for reporting the state of the RRH-equipped base station device 100-1, data received from the mobile terminal 20-1. Each of the reception buffers 121*b* stores therein an uplink frame received from the lower-level device and that is to be transferred to the higher-level device. In other words, the reception buffer 121*b* of the RRH-equipped base station device 100-1 stores therein the uplink frame received from the RRH-equipped base station device 100-2.

The uplink transmission-reception buffer unit 121 allocates the uplink frames stored in the transmission buffer 121*a* and the reception buffer 121*b* to the frame sections of uplink data in the order that the uplink frames were stored therein, and generates uplink data to be transmitted to the higher-level device.

Referring back to FIG. 2, the remaining buffer amount determining unit 122 monitors the remaining amount of the reception buffer 121*b* in the uplink transmission-reception buffer unit 121, and determines whether an empty capacity of the reception buffer 121*b* is equal to or more than a predetermined amount. For example, if the number of empty reception buffers not storing an uplink frame among the reception buffers 121*b* is equal to or less than one, the remaining buffer amount determining unit 122 notifies the stop-cancel code inserting unit 123 accordingly. Subsequently, if the number of empty reception buffers is equal to or more than two, the remaining buffer amount determining unit 122 notifies the stop-cancel code inserting unit 123 accordingly. In other words, the remaining buffer amount determining unit 122 determines whether a reception buffer in the RRH-equipped base station device 100-1 is available for storing therein the uplink frame transmitted from the RRH-equipped base station device 100-2.

Upon being notified that the number of empty reception buffers is equal to or less than one by the remaining buffer amount determining unit 122, the stop-cancel code inserting unit 123 inserts a stop code for requesting the RRH-equipped base station device 100-2 to stop transmitting uplink frames, into downlink data. At this time, the stop-cancel code inserting unit 123 inserts a stop code into an idle section, between the frame section and the idle section that form the downlink data. In other words, the downlink data includes a frame section that has a downlink frame having user data and control data, and an idle section for identifying the boundary between two frame sections. Between the two, the stop-cancel code inserting unit 123 inserts a stop code into a part of the idle section.

Upon being notified that the number of empty reception buffers has returned to equal to or more than two by the remaining buffer amount determining unit 122, the stop-cancel code inserting unit 123 inserts a cancel code for cancelling the stopped transmission of uplink frames by the RRH-equipped base station device 100-2, into downlink data. The stop-cancel code inserting unit 123, like the stop code, inserts a cancel code into a part of the idle section.

As the stop code or the cancel code, for example, any one of codes defined as invalid codes in a 4B/5B format, in which 4-bit data is converted into a 5-bit code for transmission, may be used. In other words, in the 4B/5B format, all combinations of 4-bit sequences are associated with 5-bit codes, and all 5 bits are defined to be "one" idle code and a plurality of invalid codes. If data in such a 4B/5B format is transmitted between the RRH-equipped base station devices 100-1 and 100-2, under normal circumstances, a plurality of idle codes is repeatedly placed in the idle section. However, upon inserting a stop code or a cancel code into downlink data, the stop-cancel code inserting unit 123 may replace one of the idle codes placed in the idle section with an invalid code used as the stop code or the cancel code.

The downlink transmission-reception buffer unit 124 temporarily stores therein downlink frames. In other words, the downlink transmission-reception buffer unit 124 stores therein data, control data, or the like received from the higher-level device. The downlink transmission-reception buffer unit 124 then allocates the stored downlink frames to frame sections of the downlink data in the order that the downlink frames were stored therein, and outputs the downlink frames to the lower-level communication unit 130-1. If a stop code or a cancel code is inserted into an idle section provided between two frame sections, the downlink transmission-reception buffer unit 124 outputs downlink data to which the transmission control codes are placed to the lower-level communication unit 130-1.

The lower-level communication unit 130-1 performs communication with the RRH-equipped base station device 100-2 that is a lower-level device. In other words, the lower-level communication unit 130-1 transmits downlink data to the RRH-equipped base station device 100-2, and receives uplink data transmitted from the RRH-equipped base station device 100-2.

The radio communication unit 140-1 performs wireless communication with the mobile terminal 20-1 under the charge of the RRH-equipped base station device 100-1. In other words, the radio communication unit 140-1 transmits data addressed to the mobile terminal 20-1 obtained by the frame processing unit 120-1, and receives data transmitted from the mobile terminal 20-1. The radio communication unit 140-1 then stores the data received from the mobile terminal 20-1 in the transmission buffer 121*a* of the uplink transmission-reception buffer unit 121, as an uplink frame. The radio communication unit 140-1 may also measure the wireless status of a transmission path between the mobile terminal 20-1 and the radio communication unit 140-1, and store report data for reporting the wireless status in the transmission buffer 121*a* of the uplink transmission-reception buffer unit 121, as an uplink frame.

The RRH-equipped base station device 100-2 includes a higher-level communication unit 110-2, a frame processing unit 120-2, a lower-level communication unit 130-2, and a radio communication unit 140-2.

The higher-level communication unit 110-2 performs communication with the RRH-equipped base station device 100-1 that is a higher-level device. In other words, the higher-level communication unit 110-2 receives downlink data transmitted from the RRH-equipped base station device 100-1, and transmits uplink data to the RRH-equipped base station device 100-1.

The frame processing unit 120-2 transfers the received uplink data and downlink data, and obtains data addressed to the mobile terminal 20-2 under the charge of the RRH-equipped base station device 100-2, in the downlink frame. The frame processing unit 120-2 also outputs data addressed to the mobile terminal 20-2, to the radio communication unit 140-2. The frame processing unit 120-2 further outputs data output from the radio communication unit 140-2 to the higher-level communication unit 110-2, as an uplink frame.

The frame processing unit 120-2 detects the stop code and the cancel code inserted into the downlink data, and controls the transmission in the uplink. For example, the frame processing unit 120-2 includes the uplink transmission-reception buffer unit 121, the downlink transmission-reception buffer unit 124, a stop-cancel code detecting unit 125, and an uplink transmission controlling unit 126. Because the uplink transmission-reception buffer unit 121 and the downlink transmission-reception buffer unit 124 are the same as the uplink transmission-reception buffer unit 121 and the downlink transmission-reception buffer unit 124 of the frame processing unit 120-1, the same reference numerals are denoted and the descriptions thereof are omitted.

The stop-cancel code detecting unit 125 monitors the idle section of the downlink data received by the downlink transmission-reception buffer unit 124, and detects the stop code and the cancel code in the idle section. The stop-cancel code detecting unit 125, upon detecting the stop code or the cancel code, notifies the uplink transmission controlling unit 126 accordingly.

The uplink transmission controlling unit 126 controls the transmission of uplink frames stored in the uplink transmission-reception buffer unit 121. For example, the uplink transmission controlling unit 126 allocates the uplink frames stored in the transmission buffer 121*a* and the reception buffer 121*b* in the uplink transmission-reception buffer unit 121, to the frame sections of uplink data, and outputs the uplink frames to the higher-level communication unit 110-2. At this time, the uplink transmission controlling unit 126 allocates uplink frames to all the frame sections of the uplink data, and utilizes the entire uplink band without wasting it.

However, upon being notified that the stop code is detected by the stop-cancel code detecting unit 125, the uplink transmission controlling unit 126 stops transmitting uplink frames. In other words, if the stop code is detected from the downlink data, the uplink transmission controlling unit 126 keeps the frame section of the uplink data empty, instead of allocating uplink frames to the frame sections. The uplink transmission controlling unit 126, upon being notified that the cancel code is detected by the stop-cancel code detecting unit 125, resumes transmitting uplink frames. In other words, upon detecting the cancel code from the downlink data, the uplink transmission controlling unit 126 resumes allocating uplink frames to the frame sections of the uplink data.

The lower-level communication unit 130-2 performs communication with the RRH-equipped base station device 100-3 that is a lower-level device. In other words, the lower-level communication unit 130-2 transmits downlink data to the RRH-equipped base station device 100-3, and receives uplink data transmitted from the RRH-equipped base station device 100-3.

The radio communication unit 140-2 performs wireless communication with the mobile terminal 20-2 under the charge of the RRH-equipped base station device 100-2. In other words, the radio communication unit 140-2 transmits data addressed to the mobile terminal 20-2 obtained by the frame processing unit 120-2, and receives data transmitted from the mobile terminal 20-2. The radio communication unit 140-2 stores the data received from the mobile terminal 20-2 in the transmission buffer 121*a* of the uplink transmission-reception buffer unit 121, as an uplink frame. The radio communication unit 140-2 may also measure the wireless status of a transmission path between the mobile terminal 20-2 and the radio communication unit 140-2, and store report data for reporting the wireless status in the transmission buffer 121*a* of the uplink transmission-reception buffer unit 121, as an uplink frame.

Example of Data Format

Figure 4:
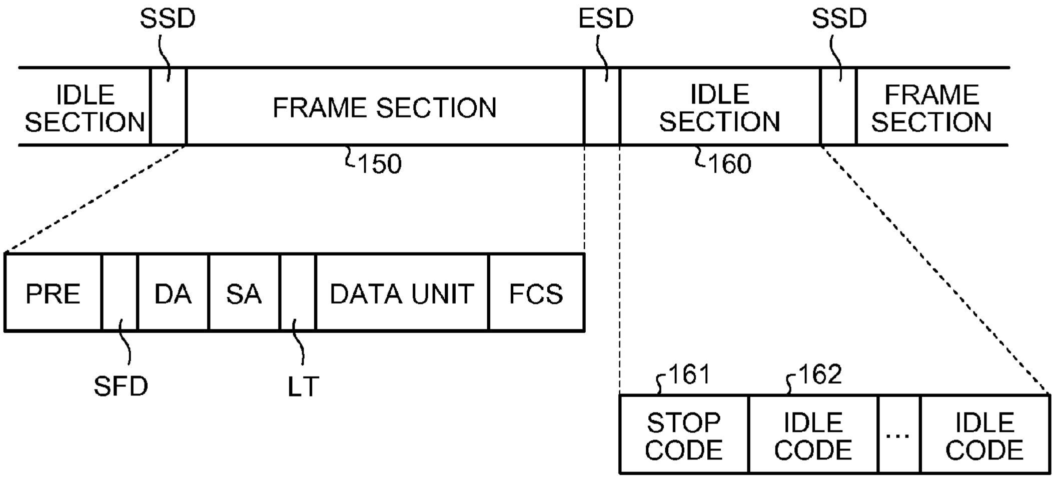
FIG. 4 is a schematic of an example of a data format according to the first embodiment.

A specific example of a data format of data transmitted between the RRH-equipped base station device 100-1 and the RRH-equipped base station device 100-2 will now be described with reference to FIG. 4. As depicted in FIG. 4, a frame section (data section) 150 and an idle section 160 are provided in the uplink data and the downlink data in the present embodiment. The frame section (data section) 150 is sandwiched between a Start-of-Stream Delimiter (SSD) indicating the start of the frame section (data section) 150 and an End-of-Stream Delimiter (ESD) indicating the end of the frame section (data section) 150.

The frame section (data section) 150 is a section to which a frame (data) with meaningful information, such as user data, control data, and report data is allocated. In other words, a downlink frame including data addressed to a mobile terminal and control data for controlling an RRH-equipped base station device is allocated to the frame section 150 of the downlink data. The uplink frame including data transmitted from the mobile terminal and report data for reporting the state of the RRH-equipped base station device is allocated to the frame section 150 of the uplink data.

These frames, as depicted in FIG. 4, have various information besides data units including data main bodies such as user data, control data, and report data. In other words, each of the frames includes a preamble (PRE), a Start Frame Delimiter (SFD) indicating the start of the frame, a Destination Address (DA) indicating an address of the frame, a Source Address (SA) indicating an address of the transmission source of the frame, a Length Type (LT) indicating the frame length, a Frame Check Sequence (FCS) that is an error detection code for the frame.

In general, the size of the data main body such as user data, control data, and report data is not constant. Accordingly, the data main body may not fall within the range between the lower and upper limit of the size of the data unit of one frame. In such an event, the data main body may be divided and stored into data units of a plurality of frames, or a portion of the data unit being smaller than the lower limit size may be padded. The uplink transmission-reception buffer unit 121 and the downlink transmission-reception buffer unit 124 store therein uplink frames and downlink frames whose sizes vary in this manner.

The idle section 160, for example, is a section to which a meaningless bit sequence is allocated to identify the boundary between two frame sections 150. For example, to detect the SSD and ESD without fail, a bit sequence that does not occur in the SSD, the ESD, or the frame section is allocated to the idle section 160. For example, in the 4B/5B format, 5-bit codes corresponding to the SSD and ESD are defined, and 5-bit codes corresponding to bit sequences to which all 4-bits can be modified to express the data included in the frame are also defined. Because a 5-bit code of "11111" different from any of these codes is defined as an idle code, the idle code is repeatedly placed in the idle section 160.

However, in the present embodiment, the stop-cancel code inserting unit 123 sometimes inserts a transmission control code for controlling the uplink transmission of the RRH-equipped base station device 100-2, into the idle section 160 of downlink data. For example, if a stop code is inserted into the idle section 160, as depicted in FIG. 4, a stop code 161 is placed in the idle section 160, and idle codes 162 are repeatedly placed in the remaining section of the idle section 160. To insert a cancel code, the stop-cancel code inserting unit 123 inserts the cancel code instead of the stop code 161. In FIG. 4, one stop code 161 is placed in the idle section 160. However, a plurality of stop codes 161 may be placed in the idle section 160. Similarly, the number of cancel codes placed in the idle section 160 is not limited to one.

Originally, such an idle section 160 is a section without meaningful information. Accordingly, for example, a conventional RRH-equipped base station device performs processing while ignoring the idle sections 160 of the uplink data and downlink data. Consequently, even if a stop code or a cancel code is inserted into the idle section 160 of the downlink data received by the conventional RRH-equipped base station device, the RRH-equipped base station device will operate properly.

A bit sequence that does not occur in the SSD, the ESD, the frame section, and the idle code is used as the stop code and the cancel code. For example, in the 4B/5B format, 5-bit codes corresponding to the SSD, the ESD, and the idle code are defined, and all combinations of 4-bit sequences are associated with 5-bit codes. Accordingly, a 5-bit code different from any of these codes is used as the stop code or the cancel code. In other words, for example, one of the invalid codes is defined as the stop code or the cancel code.

The data format depicted in FIG. 4 is an example, and other data formats are also applicable. However, it is preferable that the downlink data at least includes the frame section 150 and the idle section 160, and in the normal time, the idle section 160 is a section without meaningful information and is ignored. As the transmission control codes, an example of applying the 4B/5B format is described. However, in addition to the above example, various bit sequences may be used as the transmission control code.

Method for Communicating Uplink Data

Figure 5:
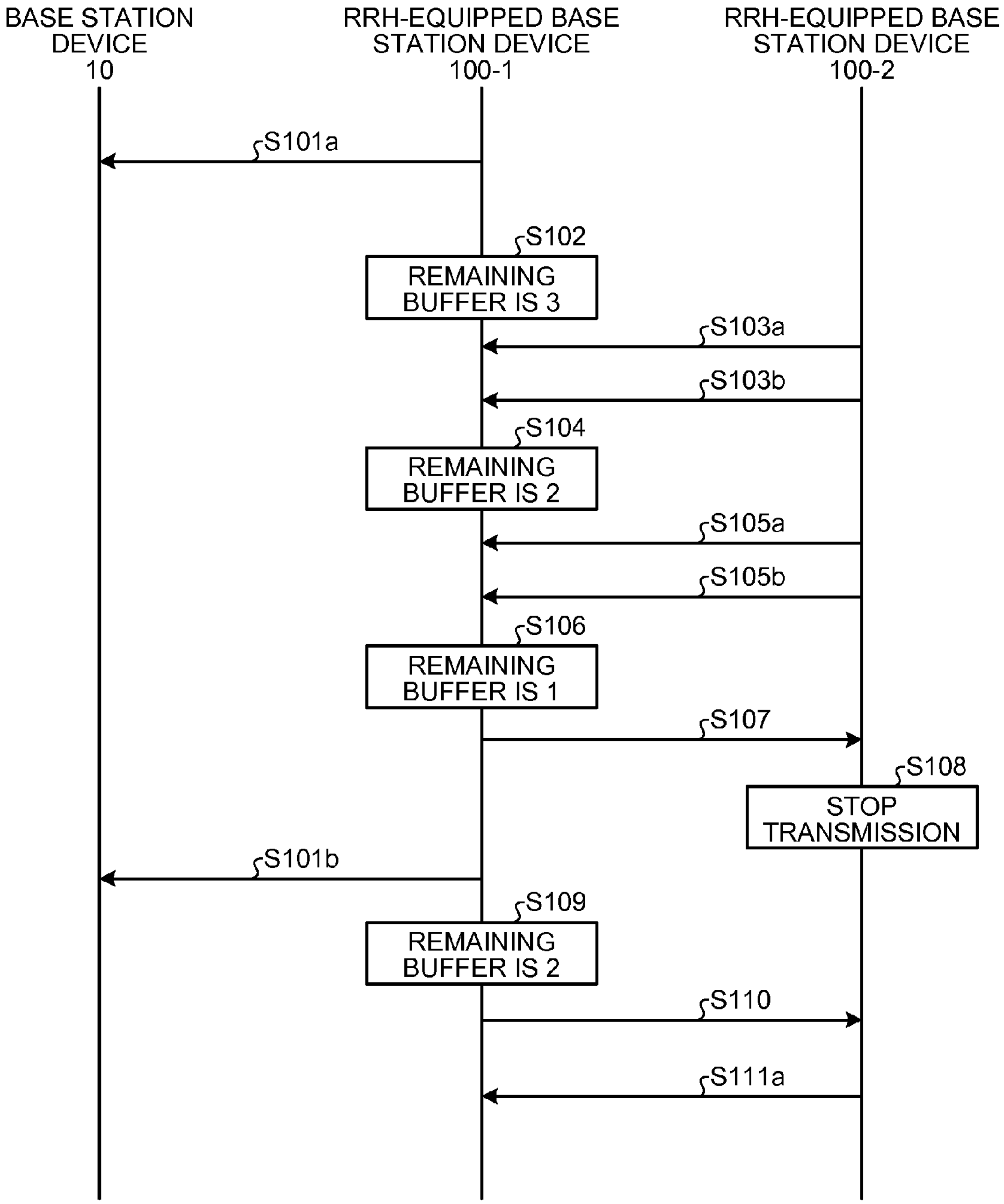
FIG. 5 is a sequence diagram of a method for communicating uplink data according to the first embodiment.

A method for communicating uplink data transmitted to the base station device 10 from the RRH-equipped base station device 100-2 according to the present embodiment will now be described with reference to a sequence diagram depicted in FIG. 5. In the following, the uplink transmission-reception buffer unit 121 of the RRH-equipped base station device 100-1 includes four reception buffers 121*b*, and an uplink frame is stored in one of the reception buffers 121*b* in the initial state.

The uplink frame stored in one of the reception buffers 121*b* of the RRH-equipped base station device 100-1 is allocated to a frame section of uplink data, and the higher-level communication unit 110-1 starts transmitting the uplink frame to the base station device 10 (Step S101*a*). From then on, the higher-level communication unit 110-1 keeps transmitting the uplink frame, and until the entire transmission of one frame has completed, one reception buffer among four reception buffers 121*b* is occupied by the uplink frame. Accordingly, at the time when the transmission of the uplink frame stored in the initial state has started, the remaining number of reception buffers is three (Step S102). Here, the remaining buffer amount determining unit 122 determines that the number of empty reception buffers is not equal to or less than one. Consequently, a stop code will not be inserted into downlink data.

The RRH-equipped base station device 100-2 then starts transmitting an uplink frame (Step S103*a*). Upon completing the transmission of one frame (Step S103*b*), the uplink frame is stored in the remaining reception buffer 121*b*. At this point, the transmission of the uplink frame stored in the initial state has not yet completed. Accordingly, the remaining number of reception buffers in the uplink transmission-reception buffer unit 121 of the RRH-equipped base station device 100-1 is two (Step S104). Here, the remaining buffer amount determining unit 122 also determines that the number of empty reception buffers is not equal to or less than one. Consequently, a stop code will not be inserted into downlink data.

The RRH-equipped base station device 100-2 then starts transmitting the next uplink frame (Step S105*a*). Upon completing the transmission of one frame (Step S105*b*), the uplink frame is stored in the remaining reception buffer 121*b*. At this point, the transmission of the uplink frame stored in the initial state has not yet completed. Accordingly, the remaining number of reception buffers in the uplink transmission-reception buffer unit 121 of the RRH-equipped base station device 100-1 is one (Step S106). Here, the remaining buffer amount determining unit 122 determines that the number of empty reception buffers is equal to or less than one, and notifies the stop-cancel code inserting unit 123 accordingly.

Upon receiving the notification, the stop-cancel code inserting unit 123 inserts a stop code into an idle section of downlink data, and the downlink data including the stop code is transmitted to the RRH-equipped base station device 100-2 (Step S107). When the RRH-equipped base station device 100-2 receives the downlink data including the stop code, the stop-cancel code detecting unit 125 detects the stop code inserted into the idle section. If the stop code is detected, the stop-cancel code detecting unit 125 notifies the uplink transmission controlling unit 126 accordingly, and the uplink transmission controlling unit 126 stops transmitting uplink frames to the RRH-equipped base station device 100-2 (Step S108). In other words, the uplink transmission controlling unit 126 stops allocating uplink frames to the frame sections of the uplink data. As a result, an uplink frame is not transmitted from the RRH-equipped base station device 100-2, and a reception buffer is available in the RRH-equipped base station device 100-1. Consequently, the loss of uplink frame transmitted from the RRH-equipped base station device 100-2 will not occur.

In this manner, the transmission of the uplink frame from the RRH-equipped base station device 100-1 that has been continued from the initial state is completed (Step S101*b*), after the RRH-equipped base station device 100-2 stops transmitting uplink frames. Accordingly, the number of empty reception buffers in the RRH-equipped base station device 100-1 is increased by one, and the remaining number of reception buffers in the uplink transmission-reception buffer unit 121 is two (Step S109). Consequently, the remaining buffer amount determining unit 122 determines that the number of empty reception buffers has returned to equal to or more than two, and notifies the stop-cancel code inserting unit 123 accordingly.

Upon receiving the notification, the stop-cancel code inserting unit 123 inserts a cancel code into an idle section of downlink data, and the downlink data including the cancel code is transmitted to the RRH-equipped base station device 100-2 (Step S110). When the RRH-equipped base station device 100-2 receives the downlink data including the cancel code, the stop-cancel code detecting unit 125 detects the cancel code inserted into the idle section. Upon detecting the cancel code, the stop-cancel code detecting unit 125 notifies the uplink transmission controlling unit 126 accordingly, and the uplink transmission controlling unit 126 resumes transmitting uplink frames to the RRH-equipped base station device 100-1 (Step S111*a*). In other words, the uplink transmission controlling unit 126 resumes allocating uplink frames to the frame sections of uplink data.

In this manner, while the reception buffer 121*b* of the RRH-equipped base station device 100-1 is available, the RRH-equipped base station device 100-2 keeps allocating uplink frames to all the frame sections of the uplink data, and transmits the uplink frames. When the reception buffer 121*b* of the RRH-equipped base station device 100-1 is not available, the RRH-equipped base station device 100-1 inserts a stop code into an idle section of downlink data. The RRH-equipped base station device 100-2 then detects the stop code in the downlink data, and stops transmitting uplink frames. In other words, while a reception buffer in the higher-level device has sufficient empty capacity, the lower-level device can transmit uplink frames without wasting the uplink band. When the reception buffer in the higher-level device does not have sufficient empty capacity, the lower-level device can stop transmitting uplink frames, thereby preventing the loss of uplink frame due to insufficient reception buffer. As a result, the uplink band to which the RRH-equipped base station devices are connected in cascade can be utilized to a maximum.

Operation Performed by Higher-Level Device

Figure 6:
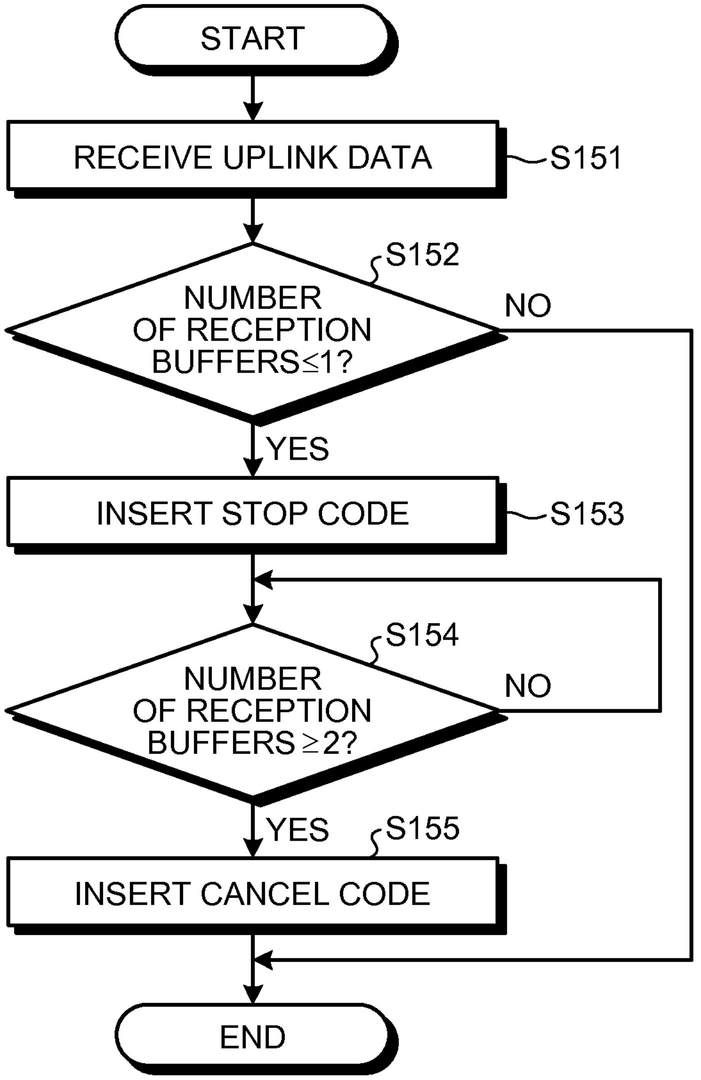
FIG. 6 is a flowchart of an operation performed by the RRH-equipped base station device according to the first embodiment.

An operation performed by the RRH-equipped base station device 100-1 corresponding to the higher-level device, between the RRH-equipped base station devices 100-1 and 100-2 will now be described with reference to a flowchart depicted in FIG. 6. In the following, an operation of inserting a stop code and a cancel code into downlink data will be mainly described.

If the lower-level communication unit 130-1 receives uplink data transmitted from the RRH-equipped base station device 100-2 (Step S151), the frame processing unit 120-1 receives the uplink data. The uplink transmission-reception buffer unit 121 of the frame processing unit 120-1 then temporarily stores therein an uplink frame allocated to the frame section of the uplink data. For example, one of the reception buffers 121*b* in the uplink transmission-reception buffer unit 121 stores therein the uplink frame including data, report data, and the like.

The remaining buffer amount determining unit 122 then determines whether the number of empty reception buffers in the uplink transmission-reception buffer unit 121 is equal to or less than one (Step S152). As a result of the determination, if the number of empty reception buffers is not equal to or less than one (NO at Step S152), it is judged that the reception buffer 121*b* is available, and processing such as inserting a stop code is not performed. In this case, the uplink frames stored in the reception buffer 121*b* are allocated to the frame sections of the uplink data in the order that the uplink frames were stored therein, and transmitted to the base station device 10 from the higher-level communication unit 110-1.

If the number of empty reception buffers is equal to or less than one (YES at Step S152), it is judged that the reception buffer 121*b* is not available, and a stop code is inserted into downlink data (Step S153). For example, the remaining buffer amount determining unit 122 notifies the stop-cancel code inserting unit 123 of the fact that the number of empty reception buffers is equal to or less than one, and the stop-cancel code inserting unit 123 inserts a stop code into an idle section of downlink data. Because the stop code is inserted into the downlink data at this point, regardless of the relation between the reception timing of the downlink data and the transmission timing of the uplink data in the RRH-equipped base station device 100-2, the number of the reception buffers 121*b* in the RRH-equipped base station device 100-1 is kept sufficient. In other words, even if the RRH-equipped base station device 100-2 starts transmitting a new uplink frame after the stop code is transmitted and immediately before the stop code is detected by the RRH-equipped base station device 100-2, the new uplink frame can be stored in the remaining one reception buffer 121*b*.

After the stop code is transmitted, the remaining buffer amount determining unit 122 monitors the number of empty reception buffers in the uplink transmission-reception buffer unit 121, and determines whether the number of empty reception buffers is equal to or more than two (Step S154). As a result of the determination, if the number of empty reception buffers is still equal to or less than one (NO at Step S154), the remaining buffer amount determining unit 122 keeps monitoring the number of empty reception buffers.

The RRH-equipped base station device 100-2 stops transmitting uplink frames, after the RRH-equipped base station device 100-1 transmits the stop code. On contrary, the RRH-equipped base station device 100-1 keeps transmitting uplink frames. Accordingly, if the uplink frame stored in the reception buffer 121*b* of the RRH-equipped base station device 100-1 is transmitted to the base station device 10, the number of empty reception buffers is increased.

If the number of empty reception buffers has returned to equal to or more than two (YES at Step S154), it is judged that the reception buffer 121*b* is available, and a cancel code is inserted into downlink data (Step S155). For example, the remaining buffer amount determining unit 122 notifies the stop-cancel code inserting unit 123 of the fact that the number of empty reception buffers is equal to or more than two, and the stop-cancel code inserting unit 123 inserts a cancel code into an idle section of downlink data. When the cancel code is transmitted, the RRH-equipped base station device 100-2 resumes transmitting uplink frames, and the reception buffer 121*b* of the RRH-equipped base station device 100-1 stores therein a newly received uplink frame.

In this manner, according to the present embodiment, if a reception buffer is not available, the higher-level RRH-equipped base station device inserts a stop code into downlink data, and stops the lower-level RRH-equipped base station device from transmitting uplink frames. The higher-level RRH-equipped base station device, if a reception buffer is available, inserts a cancel code into downlink data, and allows the lower-level RRH-equipped base station device to resume transmitting uplink frames. Accordingly, the lower-level device keeps transmitting uplink frames as long as a reception buffer in the higher-level device is available, and if the reception buffer in the higher-level device is not available, the lower-level device stops transmitting uplink frames. Consequently, the uplink band can be utilized to a maximum. In other words, it is possible to effectively use the band of the communication line to which a plurality of communication apparatuses is connected in cascade.

[b] Second Embodiment

In a second embodiment, a stop code is kept inserted into the downlink data while a reception buffer in the higher-level device is not available, and controls the lower-level device from stopping and resuming the transmission of uplink frames, by using one type of the transmission control codes.

Because a configuration of a communication system according to the present embodiment is the same as that of the communication system (FIG. 1) according to the first embodiment, the descriptions thereof are omitted.

Configuration of RRH-Equipped Base Station Device

Configurations of these RRH-equipped base station devices 100-1 and 100-2 according to the present embodiment are substantially the same as the configurations of the RRH-equipped base station devices 100-1 and 100-2 (FIG. 2) according to the first embodiment. However, inner configurations of the frame processing units 120-1 and 120-2 of the present embodiment are different from those of the first embodiment. Accordingly, in the following, configurations of the frame processing units 120-1 and 120-2 according to the present embodiment will be described.

Figure 7:
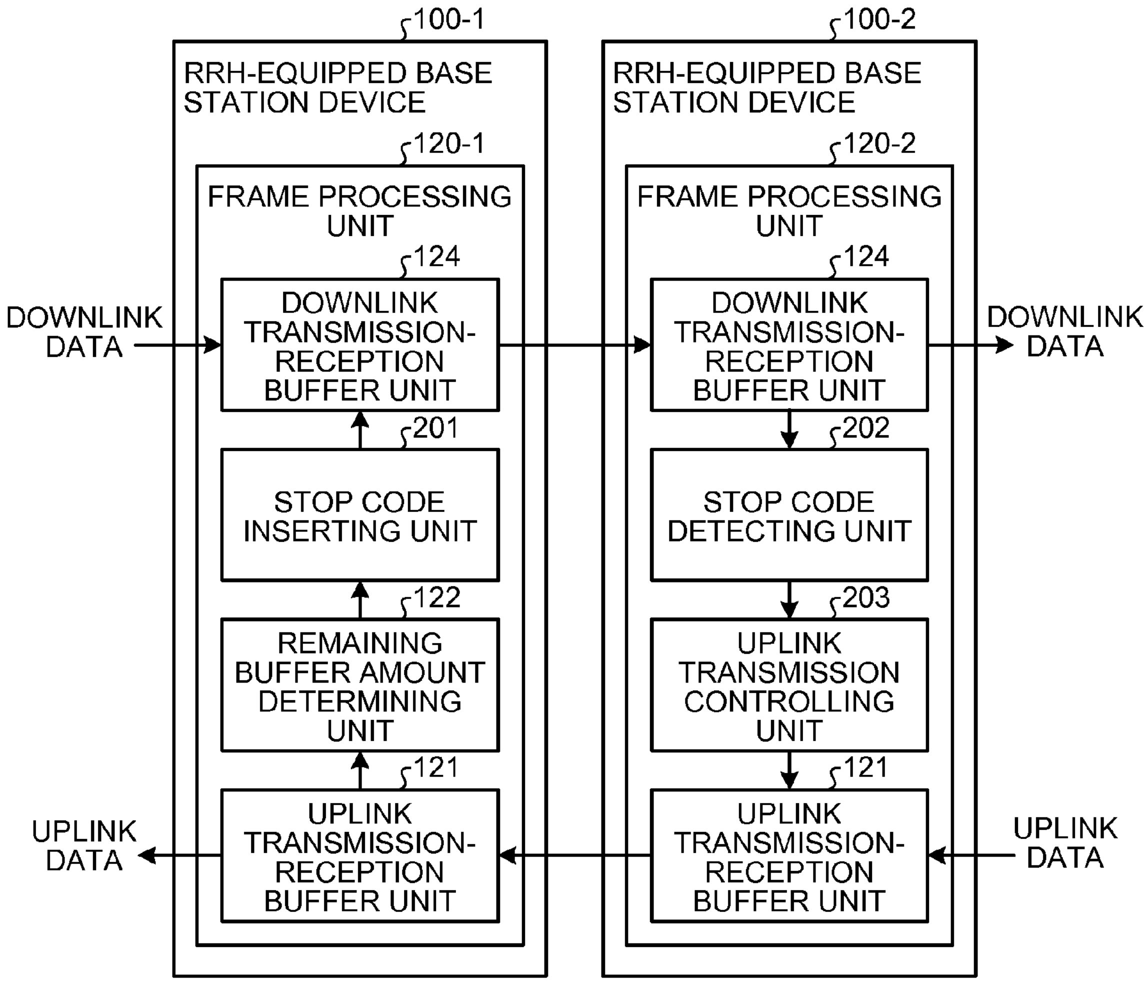
FIG. 7 is a schematic of frame processing units according to a second embodiment.

FIG. 7 is a schematic of the frame processing units 120-1 and 120-2 according to the present embodiment. In FIG. 7, the higher-level communication units 110-1 and 110-2, the lower-level communication units 130-1 and 130-2, and the radio communication units 140-1 and 140-2 are not depicted. Portions the same as those in FIG. 2 are denoted by the same reference numerals and the descriptions thereof are omitted. The frame processing unit 120-1 depicted in FIG. 7 includes the uplink transmission-reception buffer unit 121, the remaining buffer amount determining unit 122, a stop code inserting unit 201, and the downlink transmission-reception buffer unit 124.

The stop code inserting unit 201, upon being notified that the number of empty reception buffers is equal to or less than one by the remaining buffer amount determining unit 122, inserts a stop code for stopping the transmission of uplink frames into downlink data. At this time, the stop code inserting unit 201 keeps inserting stop codes into all the idle sections of the downlink data, until the remaining buffer amount determining unit 122 determines that the number of empty reception buffers is equal to or more than two.

The frame processing unit 120-2 depicted in FIG. 7 includes the uplink transmission-reception buffer unit 121, the downlink transmission-reception buffer unit 124, a stop code detecting unit 202, and an uplink transmission controlling unit 203.

The stop code detecting unit 202 monitors the idle section of the downlink data received by the downlink transmission-reception buffer unit 124, and detects the stop code in the idle section. In the present embodiment, while the uplink transmission-reception buffer unit 121 of the RRH-equipped base station device 100-1 is not available, the stop code is kept inserted into the downlink data. Accordingly, the stop code detecting unit 202 may repeatedly detect the stop codes in the idle sections. Every time the stop code is detected, the stop code detecting unit 202 notifies the uplink transmission controlling unit 203 accordingly.

The uplink transmission controlling unit 203 controls the transmission of the uplink frame stored in the uplink transmission-reception buffer unit 121. For example, the uplink transmission controlling unit 203 allocates the uplink frames stored in the transmission buffer 121*a* and the reception buffer 121*b* of the uplink transmission-reception buffer unit 121 to the frame sections of the uplink data, and outputs the uplink frames to the higher-level communication unit 110-2. At this time, the uplink transmission controlling unit 203 allocates the frames to all the frame sections of the uplink data, and utilizes the entire uplink band without wasting it.

However, upon being notified that the stop code is detected by the stop code detecting unit 202, the uplink transmission controlling unit 203 stops transmitting uplink frames. In other words, while the stop code detecting unit 202 keeps detecting the stop code in the downlink data, the uplink transmission controlling unit 203 keeps the frame section of the uplink data empty, without allocating an uplink frame to the frame section. If the stop code detecting unit 202 does not detect the stop code any more, the uplink transmission controlling unit 203 resumes transmitting uplink frames.

Method for Communicating Uplink Data

Figure 8:
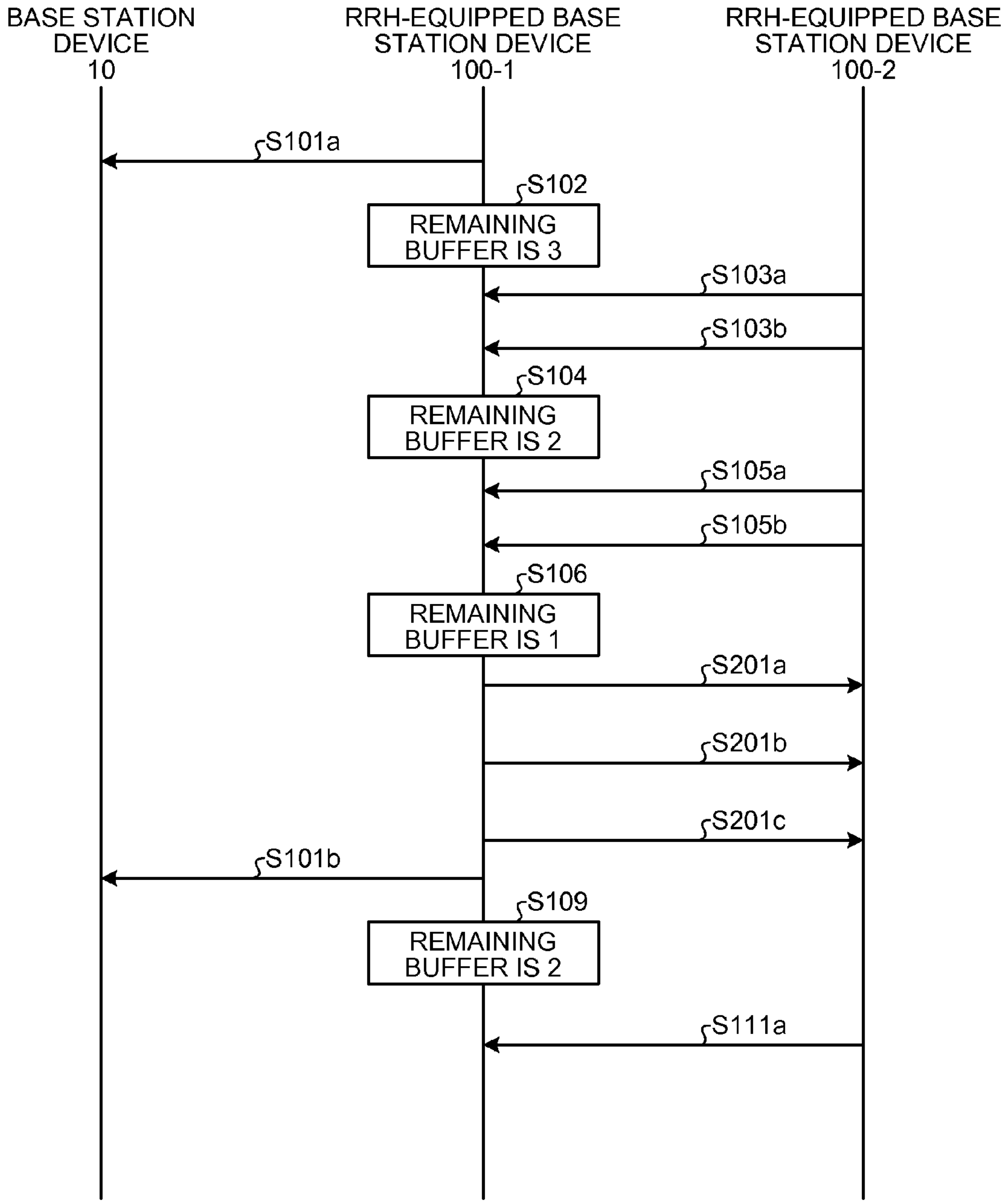
FIG. 8 is a sequence diagram of a method for communicating uplink data according to the second embodiment.

A method for communicating uplink data transmitted to the base station device 10 from the RRH-equipped base station device 100-2 according to the present embodiment will now be described with reference to a sequence diagram depicted in FIG. 8. In FIG. 8, portions the same as those in FIG. 5 are denoted by the same reference numerals, and the detailed descriptions thereof are omitted.

The uplink frame stored in one of the reception buffers 121*b* of the RRH-equipped base station device 100-1 is allocated to a frame section of uplink data, and the higher-level communication unit 110-1 starts transmitting the uplink frame to the base station device 10 (Step S101*a*). At this point, the remaining number of reception buffers is three (Step S102). Here, the remaining buffer amount determining unit 122 determines that the number of empty reception buffers is not equal to or less than one. Accordingly, a stop code is not inserted into downlink data.

The RRH-equipped base station device 100-2 repeats the transmission of an uplink frame (Steps S103*a*, S103*b*, S105*a*, and S105*b*), and the remaining number of reception buffers in the uplink transmission-reception buffer unit 121 of the RRH-equipped base station device 100-1 is one (Step S106). Here, the remaining buffer amount determining unit 122 determines that the number of empty reception buffers is equal to or less than one, and notifies the stop code inserting unit 201 accordingly.

Upon receiving the notification, the stop code inserting unit 201 inserts a stop code into an idle section of downlink data, and the downlink data including the stop code is transmitted to the RRH-equipped base station device 100-2 (Step S201*a*). Because the state in which the number of empty reception buffers is one is continued, the stop code inserting unit 201 keeps inserting stop codes into the idle sections of the downlink data, and the downlink data including the stop code is transmitted to the RRH-equipped base station device 100-2 (Steps S201*b* and S201*c*).

While the RRH-equipped base station device 100-2 keeps receiving the downlink data including the stop code, the stop code detecting unit 202 repeatedly detects the stop codes inserted into the idle sections. Every time the stop code is detected from the idle section, the stop code detecting unit 202 notifies the uplink transmission controlling unit 203 accordingly, and the uplink transmission controlling unit 203 stops transmitting uplink frames to the RRH-equipped base station device 100-1. In other words, the uplink transmission controlling unit 203 stops allocating uplink frames to the frame sections of the uplink data. As a result, an uplink frame is not transmitted from the RRH-equipped base station device 100-2, and the number of reception buffers 121*b* in the RRH-equipped base station device 100-1 is kept sufficient. Consequently, the loss of uplink frame transmitted from the RRH-equipped base station device 100-2 will not occur.

In this manner, while the transmission of uplink frames from the RRH-equipped base station device 100-2 has been stopped, the transmission of the uplink frame from the RRH-equipped base station device 100-1 continued from the initial state will be completed (Step S101*b*). Accordingly, the number of empty reception buffers in the RRH-equipped base station device 100-1 is increased by one, and the remaining number of reception buffers in the uplink transmission-reception buffer unit 121 is two (Step S109). Consequently, the remaining buffer amount determining unit 122 determines that the number of empty reception buffers has returned to equal to or more than two, and notifies the stop code inserting unit 201 accordingly.

Upon receiving the notification, the stop code inserting unit 201 stops inserting stop codes into downlink data. From then on, the stop code is not included in the downlink data transmitted to the RRH-equipped base station device 100-2. If the stop code detecting unit 202 of the RRH-equipped base station device 100-2 does not detect the stop code in the idle section any more, the uplink transmission controlling unit 203 will not be notified any more. As a result, the uplink transmission controlling unit 203 resumes transmitting uplink frames to the RRH-equipped base station device 100-1 (Step S111*a*). In other words, the uplink transmission controlling unit 203 resumes allocating uplink frames to the frame sections of the uplink data.

In this manner, while the reception buffer 121*b* of the RRH-equipped base station device 100-1 is not available, a stop code is kept inserted into the idle section of downlink data, and the RRH-equipped base station device 100-2 stops transmitting uplink frames, while the stop code is being detected from the downlink data.

Accordingly, by using one type of code as the stop code, it is possible to control the RRH-equipped base station device 100-2 from stopping and resuming the transmission of uplink frames. Consequently, even if the type of bit sequences that can be used as a transmission control code is limited, it is possible to effectively use the uplink band, by suppressing the number of codes to be used to a minimum.

Operation Performed by Higher-Level Device

Figure 9:
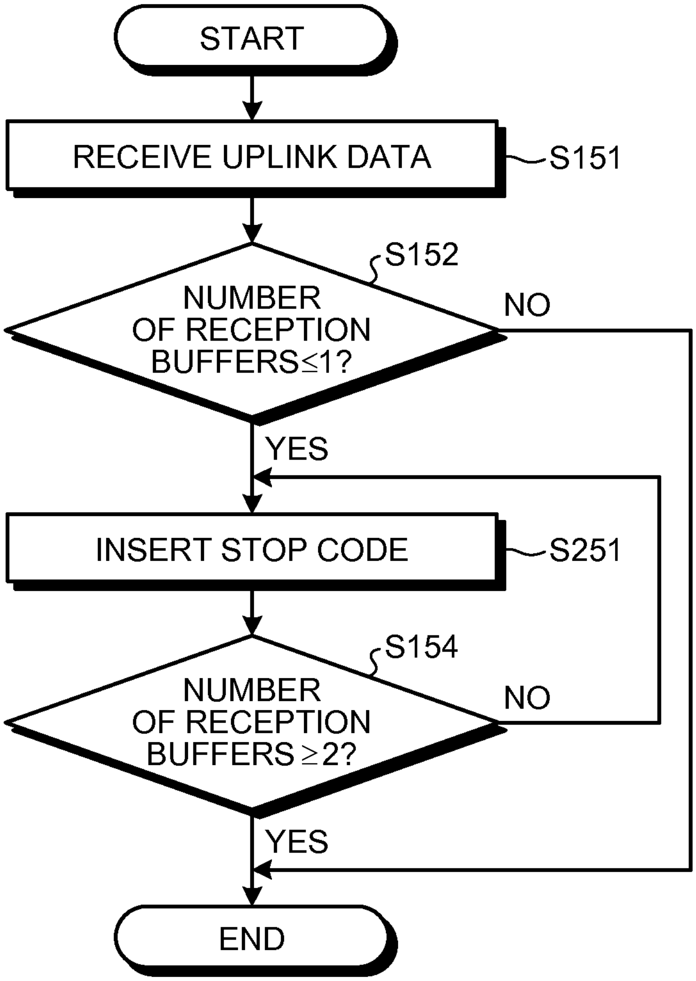
FIG. 9 is a flowchart of an operation performed by an RRH-equipped base station device according to the second embodiment.

An operation performed by the RRH-equipped base station device 100-1 corresponding to the higher-level device between the RRH-equipped base station devices 100-1 and 100-2 will now be described with reference to a flowchart depicted in FIG. 9. In FIG. 9, portions the same as those in FIG. 6 are denoted by the same reference numerals, and the detailed descriptions thereof are omitted. In the following, an operation of inserting a stop code into downlink data will mainly be described.

If the lower-level communication unit 130-1 receives uplink data transmitted from the RRH-equipped base station device 100-2 (Step S151), the frame processing unit 120-1 receives the uplink data. The uplink transmission-reception buffer unit 121 of the frame processing unit 120-1 temporarily stores therein the uplink frame allocated to the frame section of the uplink data.

The remaining buffer amount determining unit 122 then determines whether the number of empty reception buffers in the uplink transmission-reception buffer unit 121 is equal to or less than one (Step S152). As a result of the determination, if the number of empty reception buffers is not equal to or less than one (NO at Step S152), it is judged that the reception buffer 121*b* is available, and processing such as inserting a stop code is not performed.

If the number of empty reception buffers is equal to or less than one (YES at Step S152), it is judged that the reception buffer 121*b* is not available, and a stop code is inserted into downlink data (Step S251). For example, the remaining buffer amount determining unit 122 notifies the stop code inserting unit 201 of the fact that the number of empty reception buffers is equal to or less than one, and the stop code inserting unit 201 inserts a stop code into an idle section of downlink data.

After the stop code is transmitted, the remaining buffer amount determining unit 122 monitors the number of empty reception buffers in the uplink transmission-reception buffer unit 121, and determines whether the number of empty reception buffers is equal to or more than two (Step S154). As a result of the determination, if the number of empty reception buffers is still equal to or less than one (NO at Step S154), a stop code is also inserted into an idle section next to the idle section in which the stop code is previously inserted (Step S251). In this manner, while the state in which the number of empty reception buffers is equal to or less than one is continued, stop codes are kept inserted into the idle sections. If the number of empty reception buffers has returned to equal to or more than two (YES at Step S154), it is judged that the reception buffer 121*b* is available, and the downlink data is transmitted without the stop code being inserted. Because the stop code is not included in the downlink data, the RRH-equipped base station device 100-2 resumes transmitting uplink frames.

In this manner, according to the present embodiment, the higher-level RRH-equipped base station device keeps inserting stop codes into downlink data, while a reception buffer is not available, and stops the lower-level RRH-equipped base station device from transmitting uplink frames. If a reception buffer is available, the higher-level RRH-equipped base station device stops inserting a stop code into downlink data and allows the lower-level RRH-equipped base station device to resume transmitting uplink frames. Accordingly, the lower-level RRH-equipped base station device keeps transmitting uplink frames as long as a reception buffer in the higher-level device is available, and if a reception buffer in the higher-level device is not available, the lower-level device stops transmitting uplink frames. Consequently, it is possible to effectively use the uplink band. That is, it is possible to effectively use the band of the communication line to which a plurality of communication apparatuses is connected in cascade. Because only one type of the transmission control codes is used to control the lower-level RRH-equipped base station device in transmitting uplink frames, it is possible to suppress the number of transmission control codes to be used to a minimum.

[c] Third Embodiment

The RRH-equipped base station devices 100-1 and 100-2 transmit report data for reporting the states of the RRH-equipped base station devices 100-1 and 100-2 and the like, as an uplink frame. The report data, for example, includes alarm information that indicates the occurrence of abnormality in the device, and wireless status in a transmission path between the mobile terminals 20-1 and 20-2. The report data is preferably transmitted to the base station device 10 in real time. Nevertheless, if the transmission of uplink frames from the RRH-equipped base station device 100-2 is stopped by the processes in the first and the second embodiments, the transmission of report data may sometimes be delayed. In a third embodiment, the process to reduce the transmission delay of data that is preferentially transmitted through the uplink will be described.

In other words, in the third embodiment, if priority data that is preferentially transmitted as an uplink frame is present, the lower-level device inserts a request code for preferentially transmitting the data into uplink data, and reduces the transmission delay of priority data.

Because a configuration of a communication system according to the present embodiment is the same as that of the communication system (FIG. 1) according to the first embodiment, the descriptions thereof are omitted.

Configuration of RRH-Equipped Base Station Device

Configurations of these RRH-equipped base station devices 100-1 and 100-2 according to the present embodiment are substantially the same as the configurations of the RRH-equipped base station devices 100-1 and 100-2 (FIG. 2) according to the first embodiment. However, inner configurations of the frame processing units 120-1 and 120-2 of the present embodiment are different from those in the first embodiment. Accordingly, in the following, the configurations of the frame processing units 120-1 and 120-2 according to the present embodiment will be described.

Figure 10:
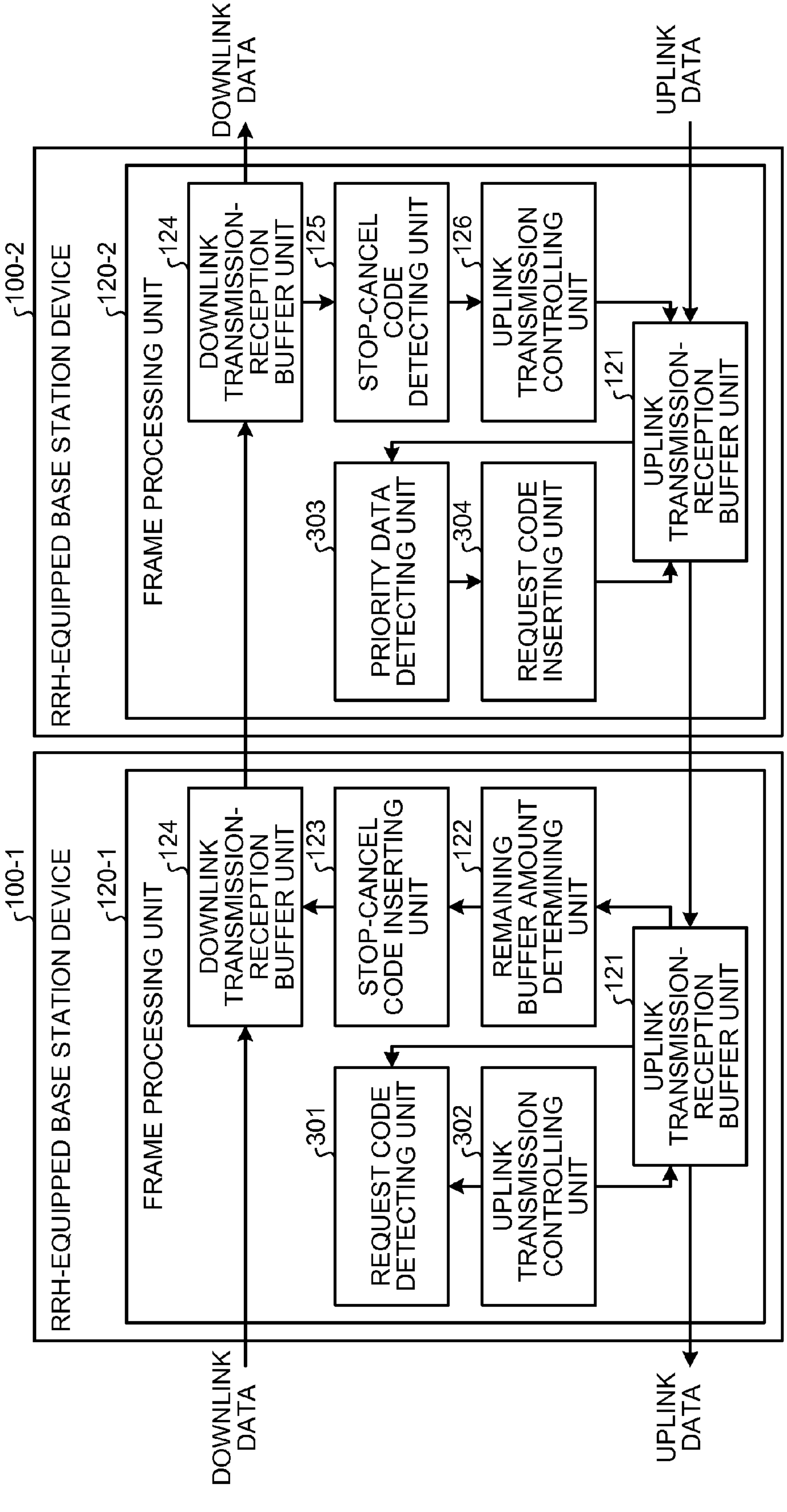
FIG. 10 is a schematic of frame processing units according to a third embodiment.

FIG. 10 is a schematic of the frame processing units 120-1 and 120-2 according to the present embodiment. In FIG. 10, the higher-level communication units 110-1 and 110-2, the lower-level communication units 130-1 and 130-2, and the radio communication units 140-1 and 140-2 are not depicted. Portions the same as those in FIG. 2 are denoted by the same reference numerals, and the descriptions thereof are omitted. The frame processing unit 120-1 depicted in FIG. 10 includes the uplink transmission-reception buffer unit 121, the remaining buffer amount determining unit 122, the stop-cancel code inserting unit 123, the downlink transmission-reception buffer unit 124, a request code detecting unit 301, and an uplink transmission controlling unit 302.

The request code detecting unit 301 monitors the idle section of the uplink data received by the uplink transmission-reception buffer unit 121, and detects a request code for requesting the transmission of priority data in the uplink in the idle section. The request code detecting unit 301, upon detecting the request code, notifies the uplink transmission controlling unit 302 accordingly.

The uplink transmission controlling unit 302 controls the transmission of uplink frames stored in the uplink transmission-reception buffer unit 121. For example, the uplink transmission controlling unit 302 allocates the uplink frames stored in the transmission buffer 121*a* and the reception buffer 121*b* of the uplink transmission-reception buffer unit 121 to the frame sections of the uplink data, and outputs to the higher-level communication unit 110-1. However, if the detection of the request code is notified from the request code detecting unit 301 to the uplink transmission controlling unit 302, the uplink transmission controlling unit 302 temporarily stops transmitting uplink frames in preparation for transmitting priority data.

In other words, the uplink transmission controlling unit 302 temporarily keeps the frame section of the uplink data empty, so that priority data can be preferentially transmitted, when the transmission of the uplink frame being transmitted through the uplink at present has completed. The uplink transmission controlling unit 302, if an uplink frame of the priority data is stored in the reception buffer 121*b* of the uplink transmission-reception buffer unit 121, immediately allocates the uplink frame to the frame section of the uplink data.

Upon being notified that the request code is detected, the uplink transmission controlling unit 302 inserts a request code into an idle section of uplink data, and transmits the uplink data. In other words, the uplink transmission controlling unit 302, in preparation for transmitting priority data, temporarily stops the higher-level device from transmitting uplink frames, by transferring the request code to the higher-level device. In this manner, because the request code is sequentially transferred to the higher-level device, the frame section of the uplink data may be kept empty to allocate the priority data in all the RRH-equipped base station devices in the uplink.

The frame processing unit 120-2 depicted in FIG. 10 includes the uplink transmission-reception buffer unit 121, the downlink transmission-reception buffer unit 124, the stop-cancel code detecting unit 125, the uplink transmission controlling unit 126, a priority data detecting unit 303, and a request code inserting unit 304.

The priority data detecting unit 303 detects priority data in the uplink frame stored in the uplink transmission-reception buffer unit 121. For example, the priority data detecting unit 303 detects report data for reporting the occurrence of abnormality in the RRH-equipped base station device 100-2, and the wireless status between the mobile terminal 20-2 and the RRH-equipped base station device 100-2, to the base station device 10 as priority data. In other words, the priority data detecting unit 303 detects the uplink frame that is transmitted to the base station device 10 in real time as priority data.

If the priority data detecting unit 303 detects the priority data, the request code inserting unit 304 inserts a request code into an idle section of uplink data. The request code inserting unit 304 allocates the priority data to a frame section subsequent to the idle section in which the request code is inserted, and transmits the priority data.

Figure 11:
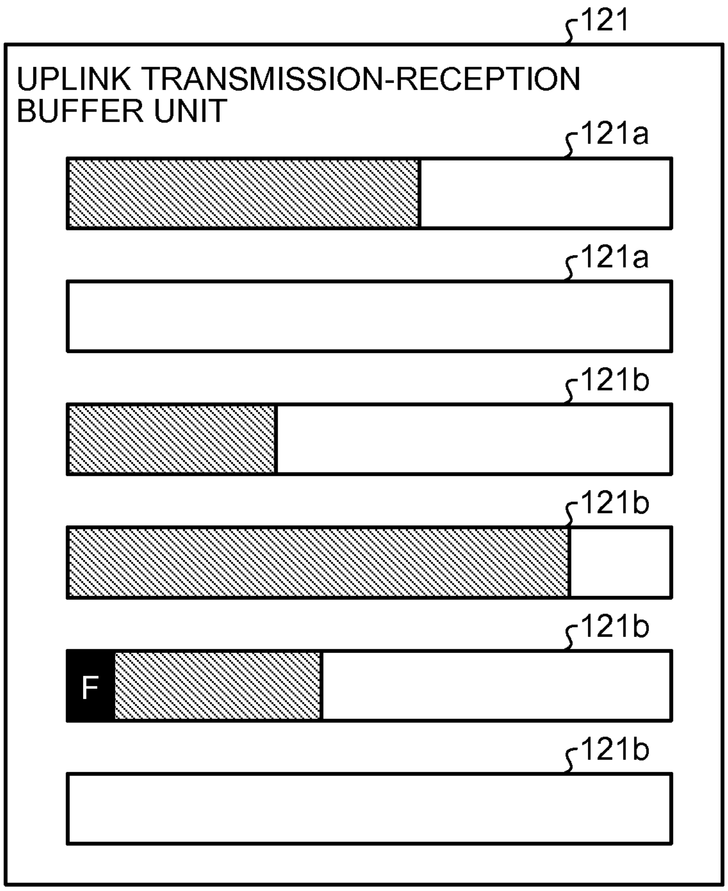
FIG. 11 is a schematic of an uplink transmission-reception buffer unit according to the third embodiment.

As depicted in FIG. 11, for example, if the priority data that is preferentially transmitted to either the transmission buffer 121*a* or the reception buffer 121*b* is stored therein, the uplink transmission-reception buffer unit 121 of the RRH-equipped base station device 100-2 adds a flag denoted by “F” in FIG. 11 to the priority data. Accordingly, if an uplink frame to which a flag is added and stored in the uplink transmission-reception buffer unit 121 is detected, it means that the priority data detecting unit 303 has detected priority data. Similarly, the uplink transmission-reception buffer unit 121 of the RRH-equipped base station device 100-1 adds a flag to priority data and stores therein. Consequently, the uplink transmission controlling unit 302 can easily distinguish the priority data to which a flag is added from the other data, and the uplink transmission controlling unit 302 can transmit the priority data at first, immediately after the request code is detected. As a result, regardless of the order being stored in the uplink transmission-reception buffer unit 121, the priority data is transmitted to the higher-level device earliest.

Method for Communicating Uplink Data

Figure 12:
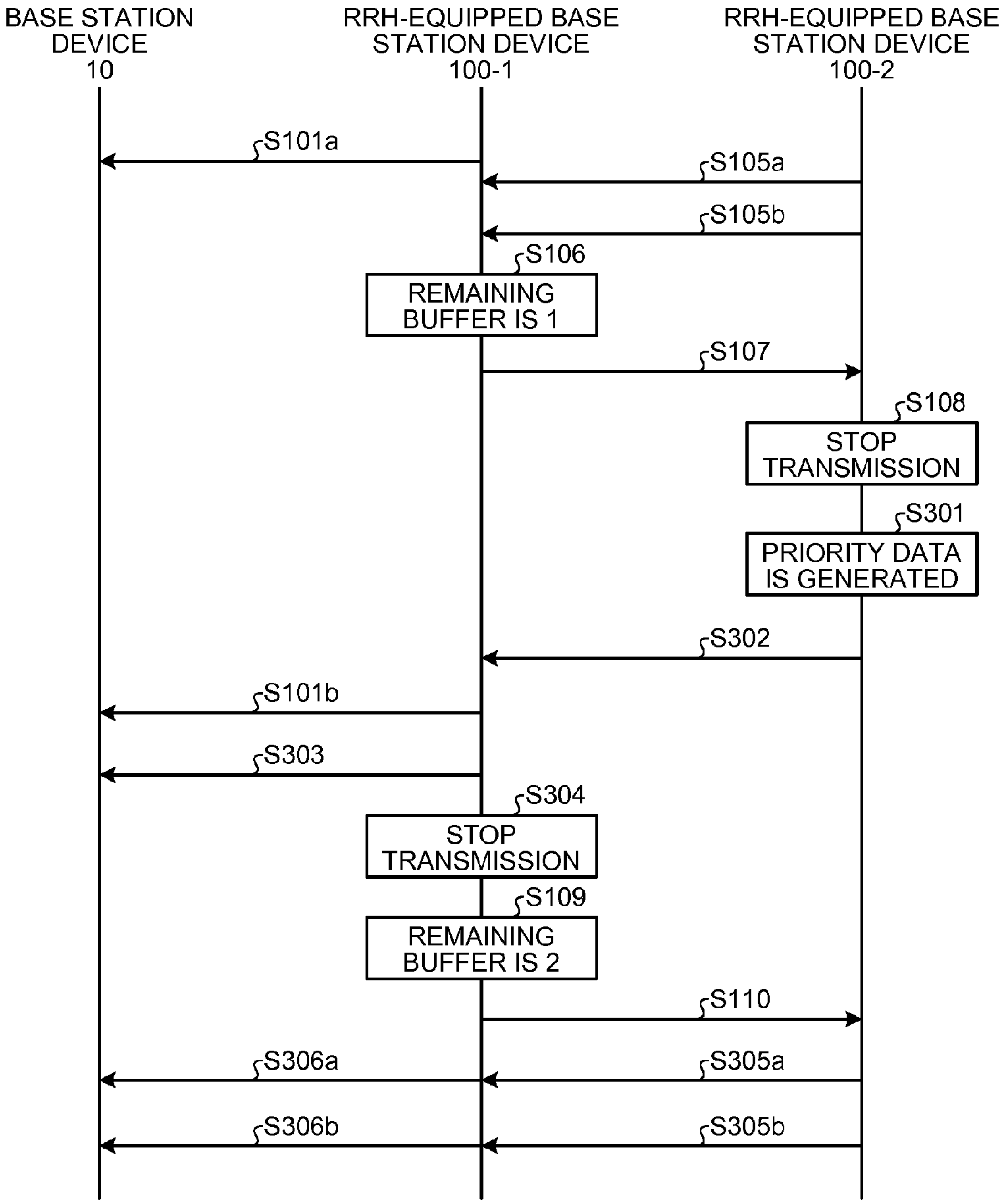
FIG. 12 is a sequence diagram of a method for communicating uplink data according to the third embodiment.

A method for communicating uplink data transmitted to the base station device 10 from the RRH-equipped base station device 100-2 according to the present embodiment will now be described with reference to a sequence diagram depicted in FIG. 12. In FIG. 12, portions the same as those in FIG. 5 are denoted by the same reference numerals, and the detailed descriptions thereof are omitted.

The uplink frame stored in one of the reception buffers 121*b* of the RRH-equipped base station device 100-1 is allocated to a frame section of uplink data, and the higher-level communication unit 110-1 starts transmitting the uplink frame to the base station device 10 (Step S101*a*). The RRH-equipped base station device 100-2 also starts transmitting an uplink frame to the RRH-equipped base station device 100-1 (Step S105*a*), thereby completing the transmission of the uplink frame (Step S105*b*). In the present embodiment, at this point, the remaining number of reception buffers is one (Step S106). Accordingly, the remaining buffer amount determining unit 122 determines that the number of empty reception buffers is equal to or less than one, and a stop code is inserted into downlink data, thereby transmitting the stop code (Step S107).

When the RRH-equipped base station device 100-2 receives the downlink data including the stop code, the uplink transmission controlling unit 126 stops transmitting uplink frames to the RRH-equipped base station device 100-1 (Step S108). Then, for example, if priority data that is preferentially transmitted to the base station device 10 when abnormality occurs in the RRH-equipped base station device 100-2 (Step S301) is generated, the priority data to which a flag is added is stored in the transmission buffer 121*a* of the uplink transmission-reception buffer unit 121.

The priority data detecting unit 303 detects the priority data to which a flag is added, and the request code inserting unit 304 inserts a request code into an idle section of uplink data. The uplink data is then transmitted to the RRH-equipped base station device 100-1 (Step S302). When the RRH-equipped base station device 100-1 receives the uplink data including the request code, the request code detecting unit 301 detects the request code inserted into the idle section. Upon detecting the request code, the request code detecting unit 301 notifies the uplink transmission controlling unit 302 accordingly. The uplink transmission controlling unit 302 then further transfers the request code to the higher-level device. In other words, upon completing the transmission of the frame section that has first started (Step S101*b*), the uplink transmission controlling unit 302 inserts a request code into the next idle section, thereby transmitting the request code (Step S303).

The uplink transmission controlling unit 302 also stops transmitting uplink frames in the frame sections, subsequent to the idle section in which the request code is inserted (Step S304). In other words, the frame section of the uplink data is kept empty, in preparation for transmitting priority data that will be received in future from the RRH-equipped base station device 100-2.

Because the transmission of the uplink frame that started first has completed, the number of empty reception buffers in the RRH-equipped base station device 100-1 is two (Step S109). Accordingly, the stop-cancel code inserting unit 123 inserts a cancel code into an idle section of downlink data, and the downlink data including the cancel code is transmitted to the RRH-equipped base station device 100-2 (Step S110). When the RRH-equipped base station device 100-2 receives downlink data including the cancel code, the uplink transmission controlling unit 126 resumes transmitting uplink frames to the RRH-equipped base station device 100-1.

Here, priority data is stored in the uplink transmission-reception buffer unit 121 of the RRH-equipped base station device 100-2. Accordingly, the request code inserting unit 304 allocates the priority data to a frame section of uplink data, and starts transmitting to the RRH-equipped base station device 100-1 (Step S305*a*). In the RRH-equipped base station device 100-1, the transmission of uplink frames has been temporarily stopped in preparation for transmitting priority data. Consequently, upon receiving the priority data, the uplink transmission controlling unit 302 immediately starts transferring the priority data to the base station device 10 (Step S306*a*). If the transmission of priority data from the RRH-equipped base station device 100-2 to the RRH-equipped base station device 100-1 has completed (Step S305*b*), the transmission of priority data from the RRH-equipped base station device 100-1 to the base station device 10 will also be completed soon afterward (Step S306*b*).

In this manner, if priority data is generated in the RRH-equipped base station device 100-2, a request code is inserted into uplink data and transferred to the base station device 10, and higher-level RRH-equipped base station devices of the RRH-equipped base station device 100-2 stop transmitting uplink frames in preparation for transmitting priority data. Accordingly, when priority data is transmitted from the RRH-equipped base station device 100-2, the higher-level RRH-equipped base station device transfers the priority data on a top priority, thereby reducing the transmission delay of priority data. Even if the transmission of uplink frames from the RRH-equipped base station device 100-2 has been stopped, when the stopped transmission is cancelled by a cancel code, the priority data can be promptly transferred in the RRH-equipped base station devices in the uplink, without stopping the transmission.

Operation Performed by RRH-Equipped Base Station Device

Figure 13:
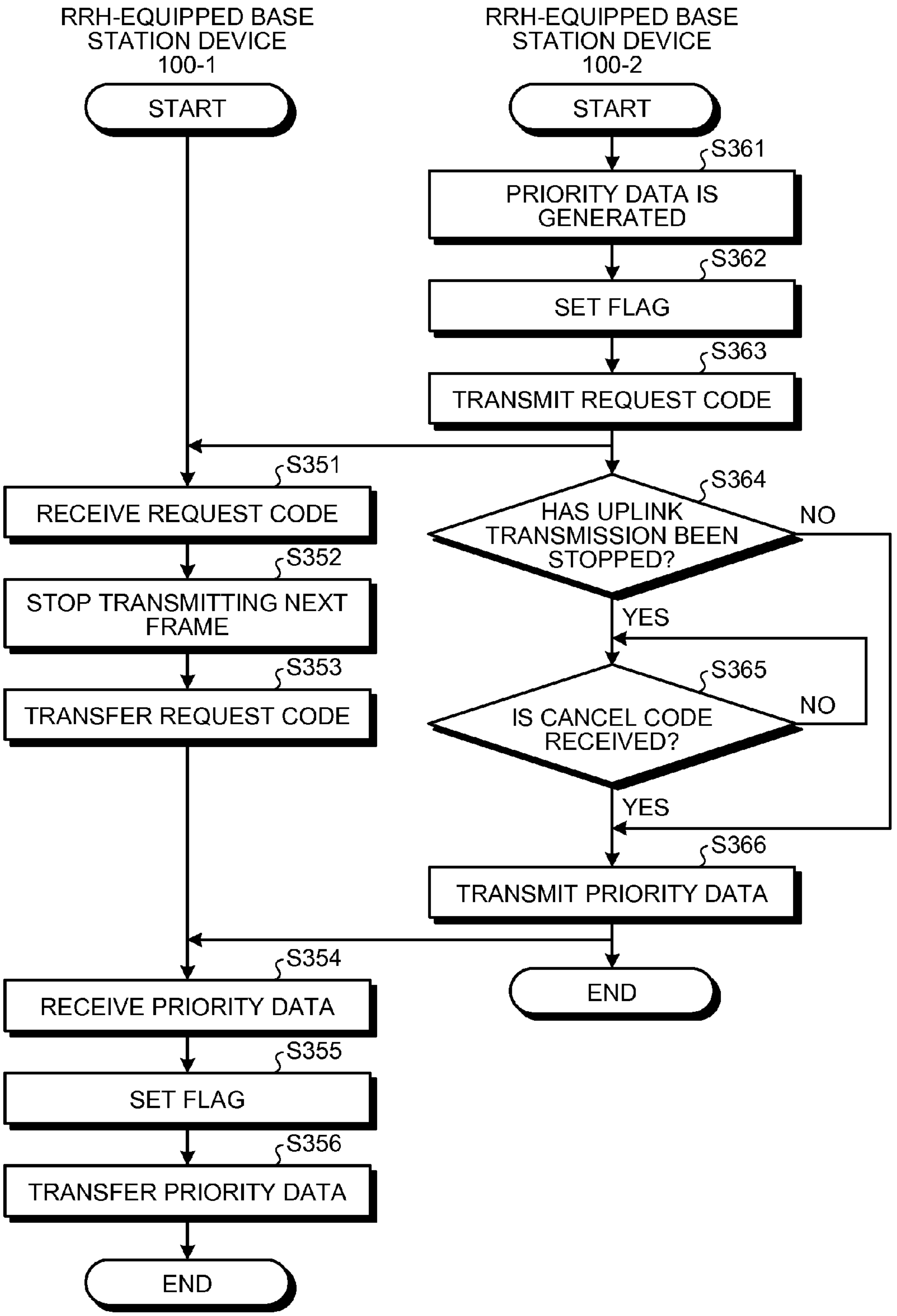
FIG. 13 is a flowchart of operations performed by RRH-equipped base station devices according to the third embodiment.

Operations performed by the RRH-equipped base station devices 100-1 and 100-2 will now be described with reference to a flowchart depicted in FIG. 13. In the following, an operation in which priority data generated in the RRH-equipped base station device 100-2 is transferred through the uplink will be mainly described.

If priority data is generated in the RRH-equipped base station device 100-2 (Step S361), and stored in the uplink transmission-reception buffer unit 121, a flag is set in the priority data (Step S362). The priority data detecting unit 303 detects the flag in the priority data, and the request code inserting unit 304 inserts a request code into an idle section of uplink data. Accordingly, the request code is transmitted to the RRH-equipped base station device 100-1 (Step S363).

When the RRH-equipped base station device 100-1 receives the request code (Step S351), the request code detecting unit 301 detects the request code, and the uplink transmission controlling unit 302 stops transmitting uplink frames from the one subsequent to the uplink frame that has been transmitted (Step S352). In other words, the frame sections subsequent to the frame section that has been transmitted are empty frame sections. The uplink transmission controlling unit 302 inserts a request code into an idle section of uplink data, and the request code is transferred to the higher-level device (Step S353).

After the request code is transmitted, the RRH-equipped base station device 100-2 transmits priority data depending on the transmission control state of the uplink. In other words, if the stop-cancel code detecting unit 125 has not yet detected the stop code from the downlink data, and if the transmission of uplink frames has not stopped (NO at Step S364), priority data is transmitted immediately after the request code is transmitted (Step S366). If the stop-cancel code detecting unit 125 has detected the stop code from the downlink data, and if the transmission of uplink frames has been stopped (YES at Step S364), the reception of the cancel code is awaited (Step S365). Upon receiving the cancel code (YES at Step S365), the priority data is allocated to a frame section of uplink data to be transmitted (Step S366).

When the RRH-equipped base station device 100-1 receives the priority data (Step S354), the priority data is stored in the reception buffer 121*b* of the uplink transmission-reception buffer unit 121, and a flag is set in the priority data (Step S355). The uplink transmission controlling unit 302 then allocates the priority data to which a flag is set to the frame section of the uplink data, and transfers the priority data to the base station device 10 (Step S356). At this time, the transmission of uplink frames from the RRH-equipped base station device 100-1 has been stopped in preparation for transferring priority data. Accordingly, the transferring of priority data will not be delayed in the RRH-equipped base station device 100-1.

As described above, according to the present embodiment, if priority data that is preferentially transmitted through the uplink is generated in the RRH-equipped base station device, this RRH-equipped base station device transmits a request code to the higher-level RRH-equipped base station device. All the RRH-equipped base station devices in the uplink subsequently transfer the request code, and stop the transmission of uplink frames in preparation for transmitting priority data. Accordingly, even if priority data is generated in the RRH-equipped base station device in which the transmission of uplink frames has been stopped by the stop code, when the transmission of uplink frames is resumed, the priority data is transferred on a top priority. Consequently, it is possible to reduce the transmission delay of priority data.

[d] Fourth Embodiment

In a fourth embodiment, if a reception buffer in the higher-level device is not available, all the RRH-equipped base station devices move to a mode for limiting the transmission band of the uplink frame, instead of stopping the lower-level device from transmitting uplink frames.

Because a configuration of a communication system according to the present embodiment is the same as that of the communication system (FIG. 1) according to the first embodiment, the descriptions thereof are omitted.

Configuration of RRH-Equipped Base Station Device

Configurations of these RRH-equipped base station devices 100-1 and 100-2 according to the present embodiment are substantially the same as the configurations of the RRH-equipped base station devices 100-1 and 100-2 (FIG. 2) according to the first embodiment. However, inner configurations of the frame processing units 120-1 and 120-2 of the present embodiment are different from those of the first embodiment. Accordingly, in the following, configurations of the frame processing units 120-1 and 120-2 according to the present embodiment will be described.

Figure 14:
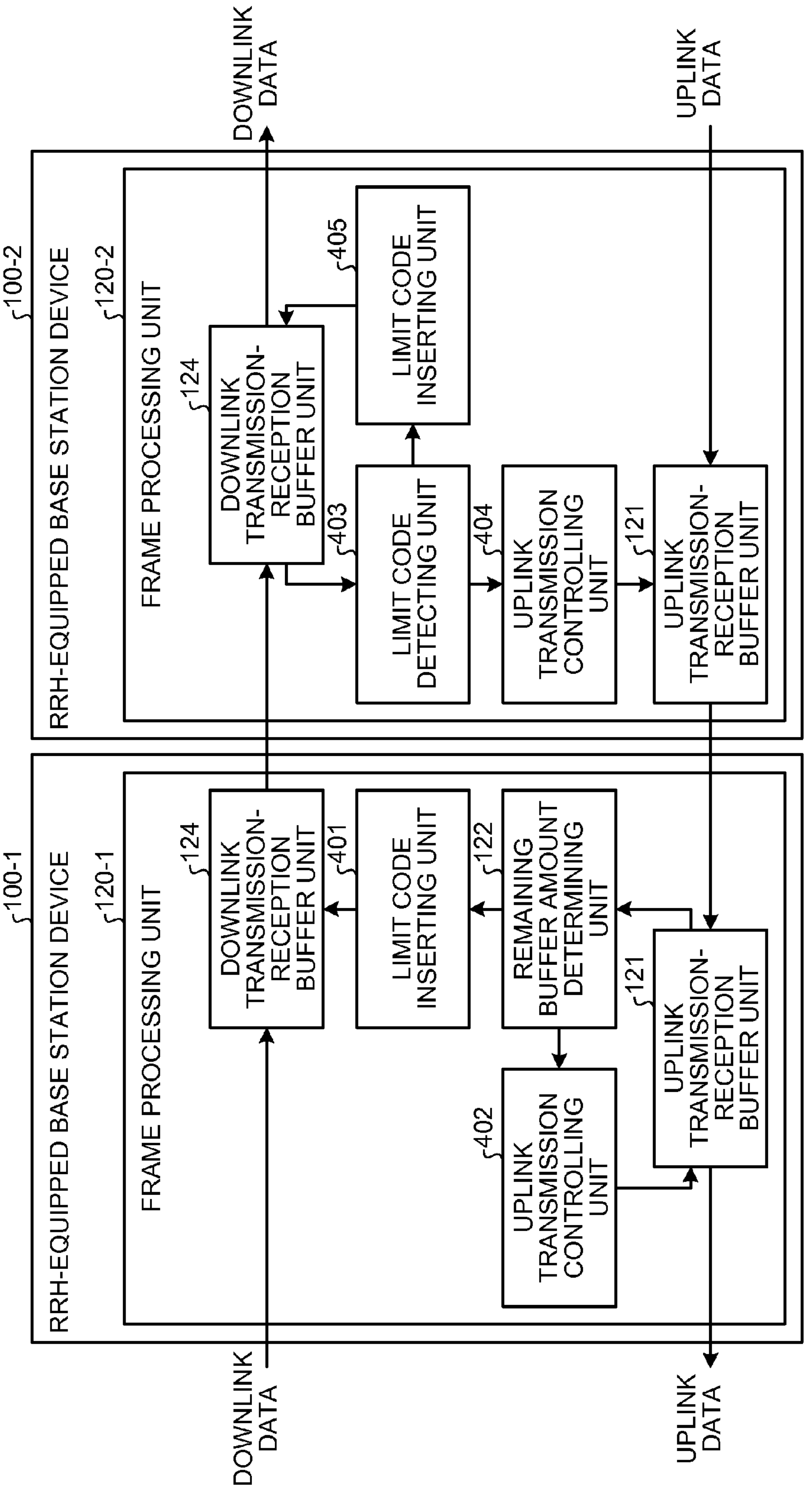
FIG. 14 is a schematic of frame processing units according to a fourth embodiment.

FIG. 14 is a schematic of the frame processing units 120-1 and 120-2 according to the present embodiment. In FIG. 14, the higher-level communication units 110-1 and 110-2, the lower-level communication units 130-1 and 130-2, and the radio communication units 140-1 and 140-2 are not depicted. Portions the same as those in FIG. 2 are denoted by the same reference numerals, and the descriptions thereof are omitted. The frame processing unit 120-1 depicted in FIG. 14 includes the uplink transmission-reception buffer unit 121, the remaining buffer amount determining unit 122, a limit code inserting unit 401, the downlink transmission-reception buffer unit 124, and an uplink transmission controlling unit 402.

Upon being notified that the number of empty reception buffers is equal to or less than one by the remaining buffer amount determining unit 122, the limit code inserting unit 401 inserts a limit code for instructing the RRH-equipped base station device to move to a band limiting mode to limit the transmission band of the uplink frame, into downlink data. At this time, the limit code inserting unit 401 keeps inserting limit codes into all the idle sections of downlink data, until the remaining buffer amount determining unit 122 determines that the number of empty reception buffers is equal to or more than three.

The uplink transmission controlling unit 402 allocates the uplink frames stored in the transmission buffer 121*a* and the reception buffer 121*b* of the uplink transmission-reception buffer unit 121 to the frame sections of uplink data, and outputs the uplink frames to the higher-level communication unit 110-1. However, if the remaining buffer amount determining unit 122 determines that the number of empty reception buffers is equal to or less than one, the uplink transmission controlling unit 402 allocates the uplink frames to the frame sections in a band limiting mode. In other words, the uplink transmission controlling unit 402 limits the transmission band of an uplink frame newly transmitted from the RRH-equipped base station device, and allocates the uplink frame stored in the transmission buffer 121*a* to the frame section assigned to the same device. In this manner, by using the frame section assigned to each of the RRH-equipped base station devices, the RRH-equipped base station device limits the transmission time during which the RRH-equipped base station device can transmit the uplink frame, the data amount that can be transmitted in the uplink frame, and the like. Accordingly, the transmission band of the uplink frame is limited.

The uplink transmission controlling unit 402 may allocate the uplink frames stored in the reception buffer 121*b* to the frame sections in the order that the uplink frames were stored therein. The uplink transmission controlling unit 402 does not allocate the uplink frames stored in the transmission buffer 121*a* to a frame section not assigned to the RRH-equipped base station device, but keeps this frame section empty. In other words, in a band limiting mode, a frame section of uplink data is equally assigned to all the RRH-equipped base station devices, and each of the RRH-equipped base station devices allocates an uplink frame newly transmitted from the RRH-equipped base station device to the frame section assigned to the RRH-equipped base station device, and transmits the uplink frame.

In the present embodiment, because the RRH-equipped base station device 100-1 is the highest-level RRH-equipped base station device, the descriptions thereof will be omitted. However, the limit code inserting unit 401 inserts a limit code also into uplink data. In other words, upon being notified that the number of empty reception buffers is equal to or less than one by the remaining buffer amount determining unit 122, the limit code inserting unit 401 inserts a limit code into uplink data, and moves the higher-level device to the band limiting mode. In short, if a reception buffer is not available in one of the RRH-equipped base station devices, the RRH-equipped base station device inserts a limit code into downlink data and uplink data, and moves all the RRH-equipped base station devices to the band limiting mode.

The frame processing unit 120-2 depicted in FIG. 14 includes the uplink transmission-reception buffer unit 121, the downlink transmission-reception buffer unit 124, a limit code detecting unit 403, an uplink transmission controlling unit 404, and a limit code inserting unit 405.

The limit code detecting unit 403 monitors the idle section of the downlink data received by the downlink transmission-reception buffer unit 124, and detects the limit code in the idle section. In the present embodiment, the limit code is kept inserted into the downlink data, while the uplink transmission-reception buffer unit 121 of the RRH-equipped base station device 100-1 is not available. Accordingly, the limit code detecting unit 403 may repeatedly detect the limit code in the idle sections. Upon detecting the limit code, the limit code detecting unit 403 notifies the uplink transmission controlling unit 404 and the limit code inserting unit 405 accordingly.

The uplink transmission controlling unit 404 controls the transmission of the uplink frames stored in the uplink transmission-reception buffer unit 121. For example, the uplink transmission controlling unit 404 allocates the uplink frames stored in the transmission buffer 121*a* and the reception buffer 121*b* of the uplink transmission-reception buffer unit 121 to the frame sections of the uplink data, and outputs the uplink frames to the higher-level communication unit 110-2. At this time, the uplink transmission controlling unit 404 allocates the frames in all the frame sections of the uplink data, and utilizes the entire uplink band without wasting it.

However, upon being notified that the limit code is detected by the limit code detecting unit 403, the uplink transmission controlling unit 404 allocates the uplink frames to the frame sections in a band limiting mode. In other words, while the limit code detecting unit 403 detects the limit code from the downlink data, the uplink transmission controlling unit 404 limits the transmission band of the uplink frame newly transmitted from the RRH-equipped base station device, and allocates the uplink frame to the frame section assigned to the RRH-equipped base station device.

Upon being notified that the limit code is detected by the limit code detecting unit 403, the limit code inserting unit 405 inserts a limit code into the downlink data, and transfers the limit code to the lower-level device. In other words, if a limit code is inserted into the idle section of the downlink data received from the higher-level device, the limit code inserting unit 405 also inserts a limit code into the idle section of the downlink data transmitted to the lower-level device.

Method for Communicating Uplink Data

Figure 15:
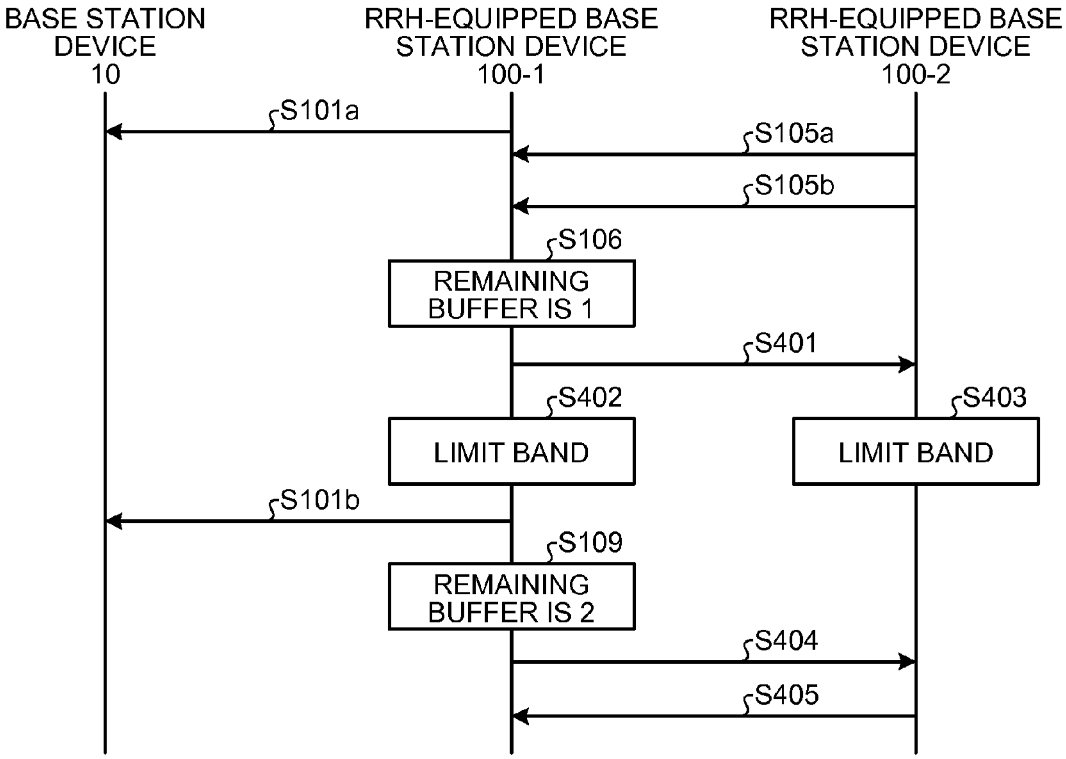
FIG. 15 is a sequence diagram of a method for communicating uplink data according to the fourth embodiment.

A method for communicating uplink data transmitted to the base station device 10 from the RRH-equipped base station device 100-2 according to the present embodiment will now be described with reference to a sequence diagram depicted in FIG. 15. In FIG. 15, portions the same as those in FIG. 5 are denoted by the same reference numerals, and the detailed descriptions thereof are omitted.

The uplink frame stored in one of the reception buffers 121*b* in the RRH-equipped base station device 100-1 is allocated to the frame section of the uplink data, and the higher-level communication unit 110-1 starts transmitting uplink frames to the base station device 10 (Step S101*a*). The RRH-equipped base station device 100-2 also starts transmitting an uplink frame to the RRH-equipped base station device 100-1 (Step S105*a*), thereby completing the transmission of the uplink frame (Step S105*b*). In the present embodiment, at this point, the remaining number of reception buffers is one (Step S106). Accordingly, the remaining buffer amount determining unit 122 determines that the number of empty reception buffers is equal to or less than one, and the limit code inserting unit 401 inserts a limit code into downlink data, thereby transmitting the limit code (Step S401).

At the same time, the uplink transmission controlling unit 402 moves the uplink communication of the RRH-equipped base station device 100-1 to a band limiting mode (Step S402). In other words, the subsequent uplink frame newly transmitted from the RRH-equipped base station device 100-1 is allocated to the frame section assigned to the RRH-equipped base station device 100-1. When the RRH-equipped base station device 100-2 receives the downlink data including the limit code, the limit code detecting unit 403 detects the limit code. Consequently, the uplink transmission controlling unit 404 moves the uplink communication of the RRH-equipped base station device 100-2 to a band limiting mode (Step S403). In other words, an uplink frame newly transmitted from the RRH-equipped base station device 100-2 is allocated to the frame section assigned to the RRH-equipped base station device 100-2.

If the transmission of the uplink frame that started first has completed (Step S101*b*), the number of empty reception buffers in the RRH-equipped base station device 100-1 is two (Step S109). In the present embodiment, the limit code is kept transmitted, until the number of empty reception buffers becomes equal to or more than three. Accordingly, the limit code inserting unit 401 keeps inserting limit codes into the downlink data to be transmitted (Step S404). Consequently, the RRH-equipped base station devices 100-1 and 100-2 keep transmitting uplink frames in a band limiting mode. In other words, for example, the RRH-equipped base station device 100-2 allocates an uplink frame newly transmitted from the same device to the frame section assigned to the RRH-equipped base station device 100-2, thereby transmitting the uplink frame (Step S405).

In this manner, if the reception buffer 121*b* in the RRH-equipped base station device 100-1 is not available, the RRH-equipped base station device 100-1 inserts a limit code into an idle section of downlink data, and all the RRH-equipped base station devices including the RRH-equipped base station devices 100-1 and 100-2 move to a band limiting mode. Accordingly, after being moved to the band limiting mode, the transmission band of each of the RRH-equipped base station devices is limited, and the number of uplink frames received by the RRH-equipped base station device 100-1 is reduced. Consequently, it is possible to prevent the loss of uplink frame due to insufficient reception buffer. As a result, the uplink band to which the RRH-equipped base station devices are connected in cascade can be utilized to a maximum.

Operation Performed by Higher-Level Device

Figure 16:
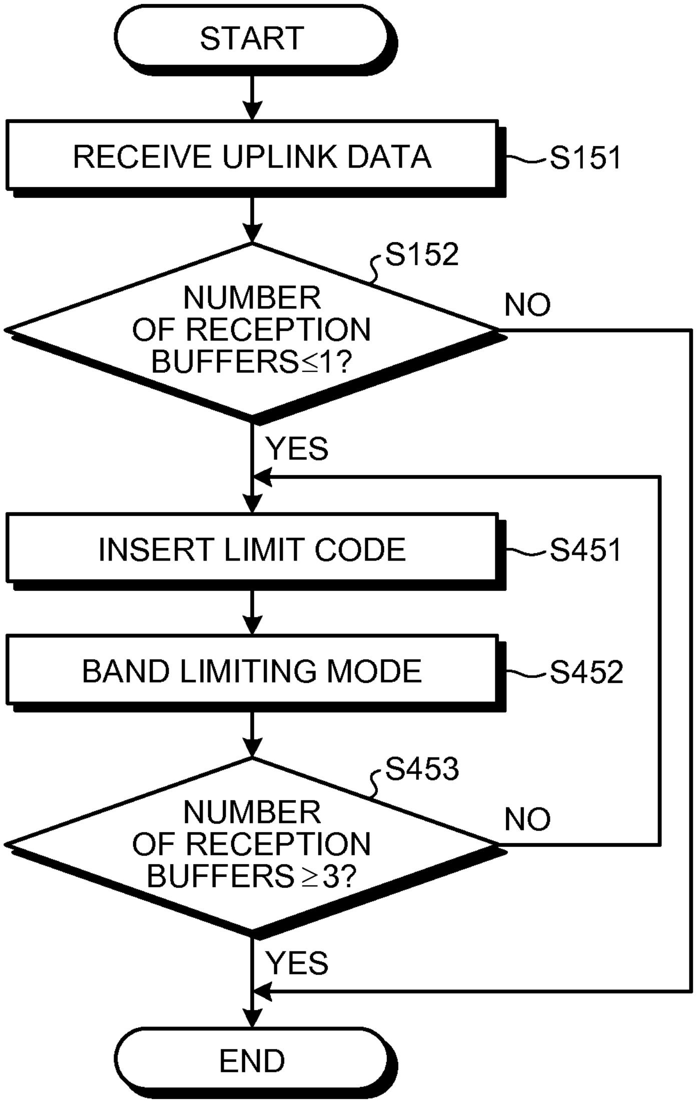
FIG. 16 is a flowchart of an operation performed by an RRH-equipped base station device according to the fourth embodiment.

An operation performed by the RRH-equipped base station device 100-1 corresponding to the higher-level device between the RRH-equipped base station devices 100-1 and 100-2 will now be described with reference to a flowchart depicted in FIG. 16. In FIG. 16, portions the same as those in FIG. 6 are denoted by the same reference numerals, and the detailed descriptions thereof are omitted. In the following, an operation of inserting a limit code into downlink data will be mainly described.

If the lower-level communication unit 130-1 receives uplink data transmitted from the RRH-equipped base station device 100-2 (Step S151), the frame processing unit 120-1 receives the uplink data. The uplink transmission-reception buffer unit 121 of the frame processing unit 120-1 then temporarily stores therein the uplink frame allocated to the frame section of the uplink data.

The remaining buffer amount determining unit 122 then determines whether the number of empty reception buffers in the uplink transmission-reception buffer unit 121 is equal to or less than one (Step S152). As a result of the determination, if the number of empty reception buffers is not equal to or less than one (NO at Step S152), it is judged that the reception buffer 121*b* is still available, and processing such as inserting a limit code is not performed.

If the number of empty reception buffers is equal to or less than one (YES at Step S152), it is judged that the reception buffer 121*b* is not available, and a limit code is inserted into downlink data (Step S451). For example, the remaining buffer amount determining unit 122 notifies the limit code inserting unit 401 of the fact that the number of empty reception buffers is equal to or less than one, and the limit code inserting unit 401 inserts a limit code into the idle section of the downlink data. At the same time, the uplink transmission controlling unit 402 moves the uplink communication of the RRH-equipped base station device 100-1 to a band limiting mode (Step S452).

After the limit code is transmitted, the remaining buffer amount determining unit 122 monitors the number of empty reception buffers in the uplink transmission-reception buffer unit 121, and determines whether the number of empty reception buffers is equal to or more than three (Step S453). As a result of the determination, if the number of empty reception buffers is equal to or less than two (NO at Step S453), a limit code is inserted also into an idle section subsequent to the idle section to which the limit code is inserted previously (Step S451). In this manner, while the number of empty reception buffers is equal to or less than two, the limit code is kept inserted into the idle sections. If the number of empty reception buffers is equal to or more than three (YES at Step S453), it is judged that the reception buffer 121*b* is available, and the downlink data is transmitted without a limit code being inserted. Subsequently, the RRH-equipped base station devices cancel the band limiting mode, and resume transmitting uplink frames as usual.

As described above, according to the present embodiment, if a reception buffer is not available, the RRH-equipped base station device moves to a band limiting mode, and moves all the RRH-equipped base station devices to the band limiting mode, by inserting a limit code into downlink data and uplink data, and transmitting the limit code. The RRH-equipped base station device that has moved to the band limiting mode allocates an uplink frame newly transmitted from the RRH-equipped base station device to the frame section assigned to the RRH-equipped base station device. Accordingly, if reception buffers are available in all the RRH-equipped base station devices, each of the RRH-equipped base station devices keeps transmitting uplink frames without limiting the band. Consequently, it is possible to utilize the uplink band to a maximum. If a reception buffer is not available in one of the RRH-equipped base station devices, all the RRH-equipped base station devices transmit uplink frames by limiting the transmission band. Consequently, the loss of uplink frame due to insufficient reception buffer can be prevented. As a result, it is possible to effectively use the band of the communication line to which a plurality of communication apparatuses is connected in cascade.

[e] Fifth Embodiment

In a fifth embodiment, the RRH-equipped base station device notifies the other RRH-equipped base station devices of transmitting an uplink frame. If the transmissions of the uplink frame performed by two or more RRH-equipped base station devices conflict, all the RRH-equipped base station devices move to a mode for limiting the transmission band of the uplink frame.

Because a configuration of a communication system according to the present embodiment is the same as that of the communication system (FIG. 1) according to the first embodiment, the descriptions thereof are omitted. However, in the present embodiment, configurations and operations of the RRH-equipped base station devices 100-2 and 100-3 that are the lower-level devices of the RRH-equipped base station device 100-1 will be mainly described. The RRH-equipped base station devices 100-2 and 100-3 according to the present embodiment correspond to the RRH-equipped base station devices 100-1 and 100-2, respectively, according to the first embodiment.

Configuration of RRH-Equipped Base Station Device

Configurations of these RRH-equipped base station devices 100-2 and 100-3 according to the present embodiment are substantially the same as the configurations of the RRH-equipped base station devices 100-1 and 100-2 (FIG. 2) according to the first embodiment. However, inner configurations of frame processing units 120-2 and 120-3 of the present embodiment are different from those of the frame processing units 120-1 and 120-2 according to the first embodiment. Here, the configurations of the frame processing units 120-2 and 120-3 according to the present embodiment will be described.

Figure 17:
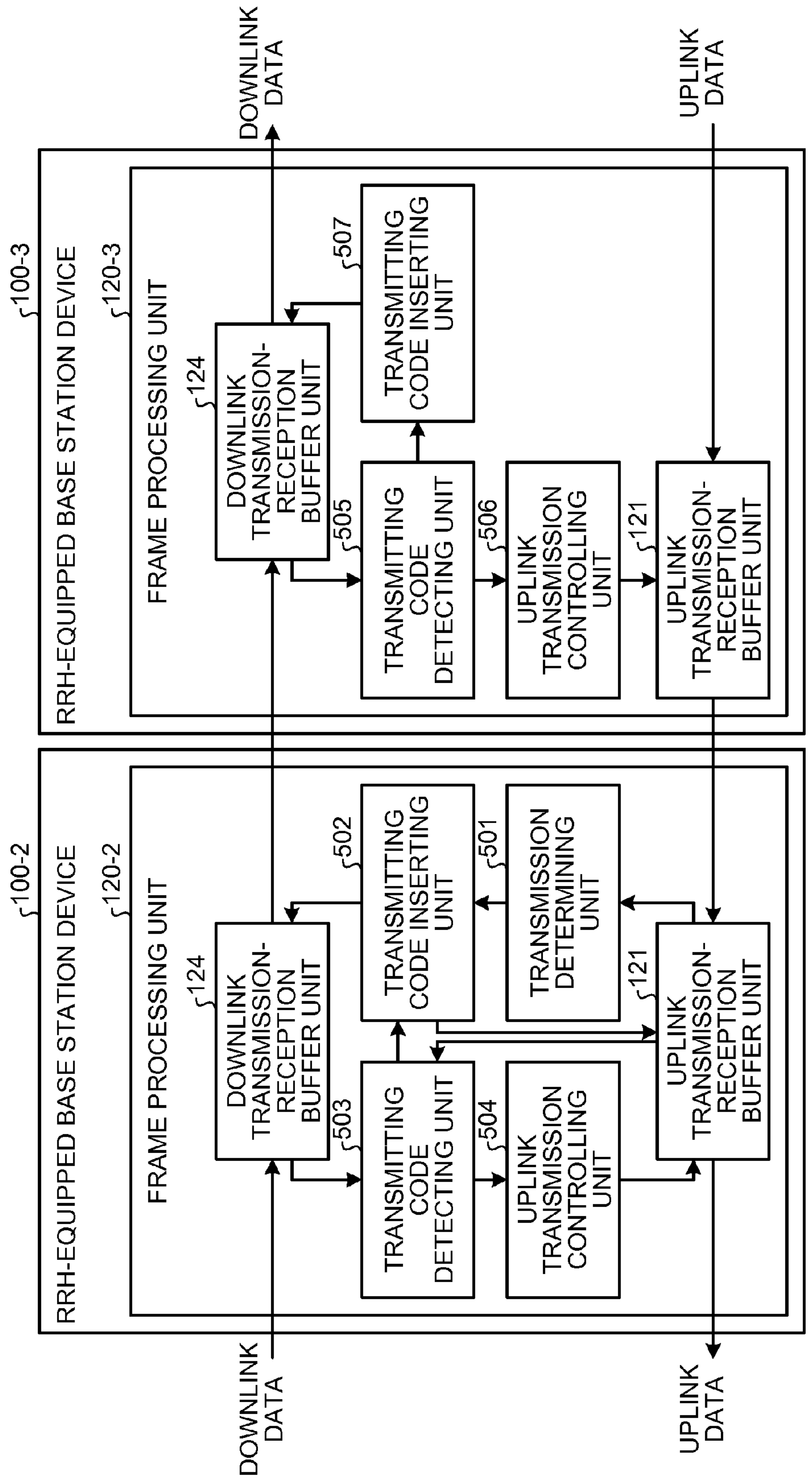
FIG. 17 is a schematic of frame processing units according to a fifth embodiment.

FIG. 17 is a schematic of the frame processing units 120-2 and 120-3 according to the present embodiment. In FIG. 17, the higher-level communication units 110-2 and 110-3, the lower-level communication units 130-2 and 130-3, and the radio communication units 140-2 and 140-3 are not depicted. Portions the same as those in FIG. 2 are denoted by the same reference numerals, and the descriptions thereof are omitted. The frame processing unit 120-2 depicted in FIG. 17 includes the uplink transmission-reception buffer unit 121, the downlink transmission-reception buffer unit 124, a transmission determining unit 501, a transmitting code inserting unit 502, a transmitting code detecting unit 503, and an uplink transmission controlling unit 504.

The transmission determining unit 501 determines whether the RRH-equipped base station device 100-2 executes the transmission of an uplink frame newly transmitted from the RRH-equipped base station device 100-2. For example, the transmission determining unit 501 determines whether an uplink frame is stored in the transmission buffer 121*a* of the uplink transmission-reception buffer unit 121.

If the transmission determining unit 501 determines that the transmission of an uplink frame will be executed, the transmitting code inserting unit 502 inserts a transmitting code indicating that the RRH-equipped base station device 100-2 is transmitting the uplink frame, into both downlink data and uplink data. If the transmitting code detecting unit 503 detects the transmitting code from the downlink data, the transmitting code inserting unit 502 also inserts the transmitting code into a downlink data transmitted from the RRH-equipped base station device 100-2. Similarly, if the transmitting code detecting unit 503 detects the transmitting code from the uplink data, the transmitting code inserting unit 502 also inserts the transmitting code into an uplink data transmitted from the RRH-equipped base station device 100-2. Upon inserting transmitting codes, the transmitting code inserting unit 502 inserts the transmitting codes into idle sections of the downlink data and uplink data.

The transmitting code detecting unit 503 monitors the idle section of the downlink data received by the downlink transmission-reception buffer unit 124, and detects the transmitting code in the idle section of the downlink data. Similarly, the transmitting code detecting unit 503 monitors the idle section of the uplink data received by the uplink transmission-reception buffer unit 121, and detects the transmitting code in the idle section of the uplink data. Upon detecting the transmitting code in the idle section of the downlink data or uplink data, the transmitting code detecting unit 503 notifies the transmitting code inserting unit 502 and the uplink transmission controlling unit 504 accordingly.

The uplink transmission controlling unit 504 allocates the uplink frames stored in the transmission buffer 121*a* and the reception buffer 121*b* of the uplink transmission-reception buffer unit 121, to the frame sections of the uplink data, and outputs the uplink frames to the higher-level communication unit 110-2. However, if the transmitting code detecting unit

503 detects the transmitting code, the uplink transmission controlling unit 504 allocates the uplink frames to the frame sections in a band limiting mode. In other words, the uplink transmission controlling unit 504 controls the transmission band of the uplink frame newly transmitted from the RRH-equipped base station device 100-2, and allocates the uplink frame stored in the transmission buffer 121*a* to the frame section assigned to the RRH-equipped base station device 100-2.

The uplink transmission controlling unit 504 may allocate the uplink frames stored in the reception buffer 121*b* to the frame sections in the order that the uplink frames were stored therein. The uplink transmission controlling unit 504 does not allocate the uplink frame stored in the transmission buffer 121*a* to a frame section not assigned to the RRH-equipped base station device 100-2, but keeps this frame section empty. In other words, in the band limiting mode, the frame section of the uplink data is equally assigned to all the RRH-equipped base station devices. Each of the RRH-equipped base station devices allocates an uplink frame newly transmitted from the RRH-equipped base station device to the frame section assigned to the same device, thereby transmitting the uplink frame.

The frame processing unit 120-3 depicted in FIG. 17 includes the uplink transmission-reception buffer unit 121, the downlink transmission-reception buffer unit 124, a transmitting code detecting unit 505, an uplink transmission controlling unit 506, and a transmitting code inserting unit 507.

The transmitting code detecting unit 505 monitors the idle section of the downlink data received by the downlink transmission-reception buffer unit 124, and detects a transmitting code in the idle section of the downlink data. Upon detecting the transmitting code in the idle section of the downlink data, the transmitting code detecting unit 505 notifies the uplink transmission controlling unit 506 and the transmitting code inserting unit 507 accordingly.

The uplink transmission controlling unit 506 allocates the uplink frames stored in the transmission buffer 121*a* and the reception buffer 121*b* in the uplink transmission-reception buffer unit 121, to the frame sections of the uplink data, and outputs the uplink frames to the higher-level communication unit 110-3. However, if the transmitting code detecting unit 505 detects the transmitting code, the uplink transmission controlling unit 506 allocates the uplink frames to the frame sections in a band limiting mode. In other words, the uplink transmission controlling unit 506 controls the transmission band of an uplink frame newly transmitted from the same device, and allocates the uplink frame stored in the transmission buffer 121*a* to the frame section assigned to the RRH-equipped base station device 100-3.

If the transmitting code detecting unit 505 detects the transmitting code from the downlink data, the transmitting code inserting unit 507 inserts the transmitting code also into downlink data transmitted from the RRH-equipped base station device 100-3. Upon inserting a transmitting code, the transmitting code inserting unit 507 inserts the transmitting code into the idle section of the downlink data.

In the present embodiment, although the description is omitted because the communication between the RRH-equipped base station device 100-3 and the lower-level device, which is not depicted, is not taken into account, similarly to the transmitting code detecting unit 503, the transmitting code detecting unit 505 also detects the transmitting code from the uplink data. Even if the transmitting code is detected from the uplink data, the uplink transmission controlling unit 506 also allocates the uplink frames to the frame sections in a band limiting mode. If the transmitting code is detected from the uplink data, the transmitting code inserting unit 507 also inserts the transmitting code into the uplink data transmitted from the RRH-equipped base station device 100-3.

Method for Communicating Uplink Data

Figure 18:
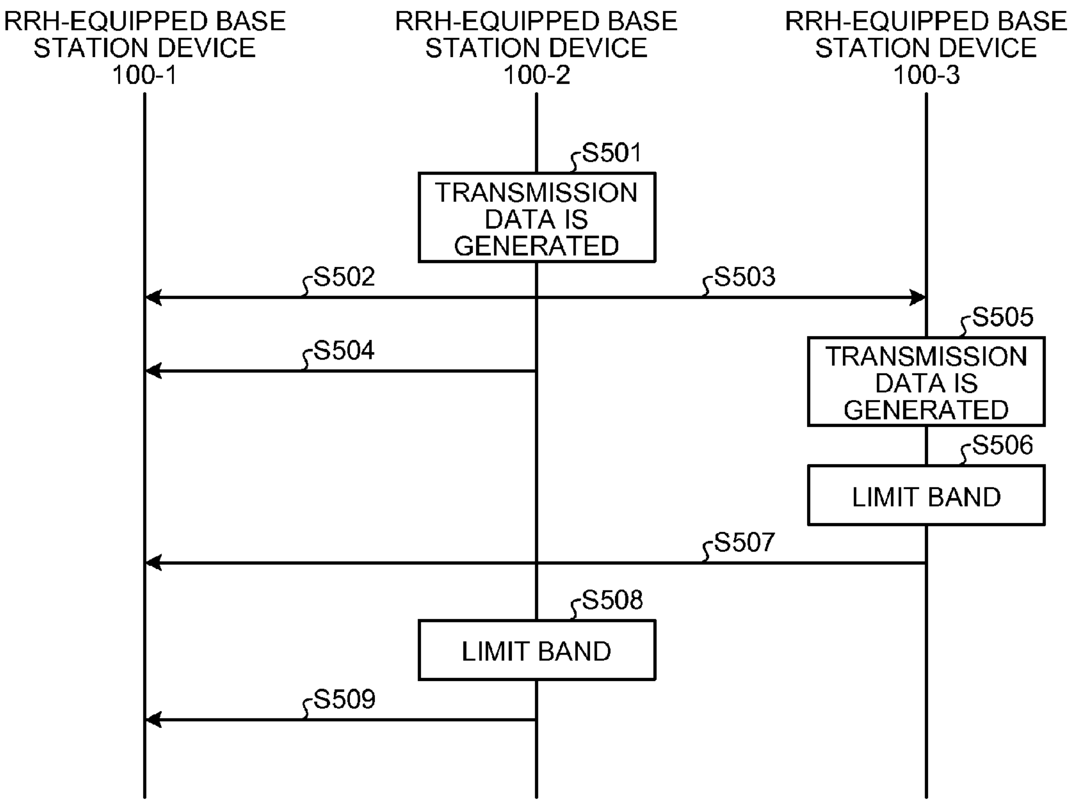
FIG. 18 is a sequence diagram of a method for communicating uplink data according to the fifth embodiment.

A method for communicating uplink data transmitted to the base station device 10 from the RRH-equipped base station device 100-3 according to the present embodiment will now be described with reference to a sequence diagram depicted in FIG. 18. The following will describe the case where transmission data newly transmitted from the RRH-equipped base station device 100-2 is generated in the RRH-equipped base station device 100-2, and transmission data newly transmitted from the RRH-equipped base station device 100-3 is then generated in the RRH-equipped base station device 100-3.

If transmission data newly transmitted from the RRH-equipped base station device 100-2 is generated (Step S501), the uplink frame including the transmission data is stored in the transmission buffer 121*a* in the uplink transmission-reception buffer unit 121. The transmission data newly transmitted from the RRH-equipped base station device 100-2 is data including report data for reporting the state of the RRH-equipped base station device 100-2, data transmitted from the mobile terminal 20-2 under the charge of the RRH-equipped base station device 100-2, and the like.

If the uplink frame is stored in the transmission buffer 121*a* in the uplink transmission-reception buffer unit 121, the transmission determining unit 501 determines that the transmission of the uplink frame will be executed. Based on the determination, the transmitting code inserting unit 502 inserts a transmitting code into idle sections of the downlink data and uplink data. Accordingly, the uplink data into which the transmitting code is inserted is transmitted to the RRH-equipped base station device 100-1 (Step S502), and the downlink data into which the transmitting code is inserted is transmitted to the RRH-equipped base station device 100-3 (Step S503). When the RRH-equipped base station device 100-3 receives the downlink data including the transmitting code, the transmitting code detecting unit 505 detects the transmitting code. The transmitting code inserting unit 507 then inserts the transmitting code into downlink data also transmitted from the RRH-equipped base station device 100-3.

In this manner, the transmitting code is transferred to the higher-level device and the lower-level device of the RRH-equipped base station device in which transmission data is generated. Accordingly, each of the RRH-equipped base station devices can judge whether an RRH-equipped base station device in which the transmission data is generated is present in the communication system.

After transmitting the transmitting code, in the RRH-equipped base station device 100-2, the uplink transmission controlling unit 504 allocates an uplink frame including the transmission data to the frame section of the uplink data, thereby transmitting the uplink frame. Here, because the transmitting code detecting unit 503 has not detected the transmitting code, the uplink transmission controlling unit 504 is operated in a normal mode. In other words, the uplink frames stored in the transmission buffer 121*a* and the reception buffer 121*b* are allocated to all the frame sections of the uplink data, in the order that the uplink frames were stored therein. The uplink data in which the uplink frame is allocated in a normal mode is transmitted to the RRH-equipped base station device 100-1 (Step S504).

If transmission data newly transmitted from the RRH-equipped base station device 100-3 is generated (Step S505), the uplink frame including the transmission data is stored in the transmission buffer 121*a* of the uplink transmission-reception buffer unit 121. Here, the transmission data newly transmitted from the RRH-equipped base station device 100-3 is data including report data for reporting the state of the RRH-equipped base station device 100-3, data transmitted from the mobile terminal under the charge of the RRH-equipped base station device 100-3, and the like.

The uplink frame stored in the transmission buffer 121*a* in the uplink transmission-reception buffer unit 121 is allocated to the frame section of the uplink data. However, here, because the transmitting code detecting unit 505 has detected the transmitting code, the uplink transmission controlling unit 506 is operated in a band limiting mode (Step S506). In other words, the uplink frame stored in the transmission buffer 121*a* is allocated to the frame section assigned to the RRH-equipped base station device 100-3 among the frame sections of the uplink data. The uplink data in which the uplink frame is allocated in a band limiting mode is transmitted to the RRH-equipped base station device 100-1 through the RRH-equipped base station device 100-2 (Step S507).

If transmission data is generated in the RRH-equipped base station device 100-3, similarly to when transmission data is generated in the RRH-equipped base station device 100-2, a transmitting code is transmitted to the higher-level device and the lower-level device from the RRH-equipped base station device 100-3. Accordingly, in the RRH-equipped base station device 100-2, the transmitting code detecting unit 503 detects the transmitting code in the uplink data. If the transmitting code detecting unit 503 detects the transmitting code, it is judged that transmission data is generated in two or more RRH-equipped base station devices including the RRH-equipped base station device 100-2. Accordingly, the uplink transmission controlling unit 504 moves to a band limiting mode (Step S508).

Consequently, in the subsequent transmissions of uplink frames, the uplink frame stored in the transmission buffer 121*a* is allocated to the frame section assigned to the RRH-equipped base station device 100-2 among the frame sections of the uplink data. The uplink data in which the uplink frame is allocated in a band limiting mode is transmitted to the RRH-equipped base station device 100-1 (Step S509).

In this manner, if transmission data is generated in one RRH-equipped base station device 100-2, the uplink frame is transmitted from the RRH-equipped base station device 100-2 without the transmission band being limited. If transmission data is generated in both the RRH-equipped base station devices 100-2 and 100-3, the RRH-equipped base station devices 100-2 and 100-3 transmit the uplink frame including the transmission data, by using the frame sections assigned to the RRH-equipped base station devices 100-2 and 100-3. Accordingly, while the number of RRH-equipped base station devices that transmit a new uplink frame is one, the RRH-equipped base station device can utilize the uplink band to a maximum, thereby not wasting the band. If the number of RRH-equipped base station devices that transmit a new uplink frame is equal to or more than two, the RRH-equipped base station devices can prevent the generation of insufficient uplink band, by transmitting the uplink frame by limiting the band.

Operation Performed by Higher-Level Device

Figure 19:
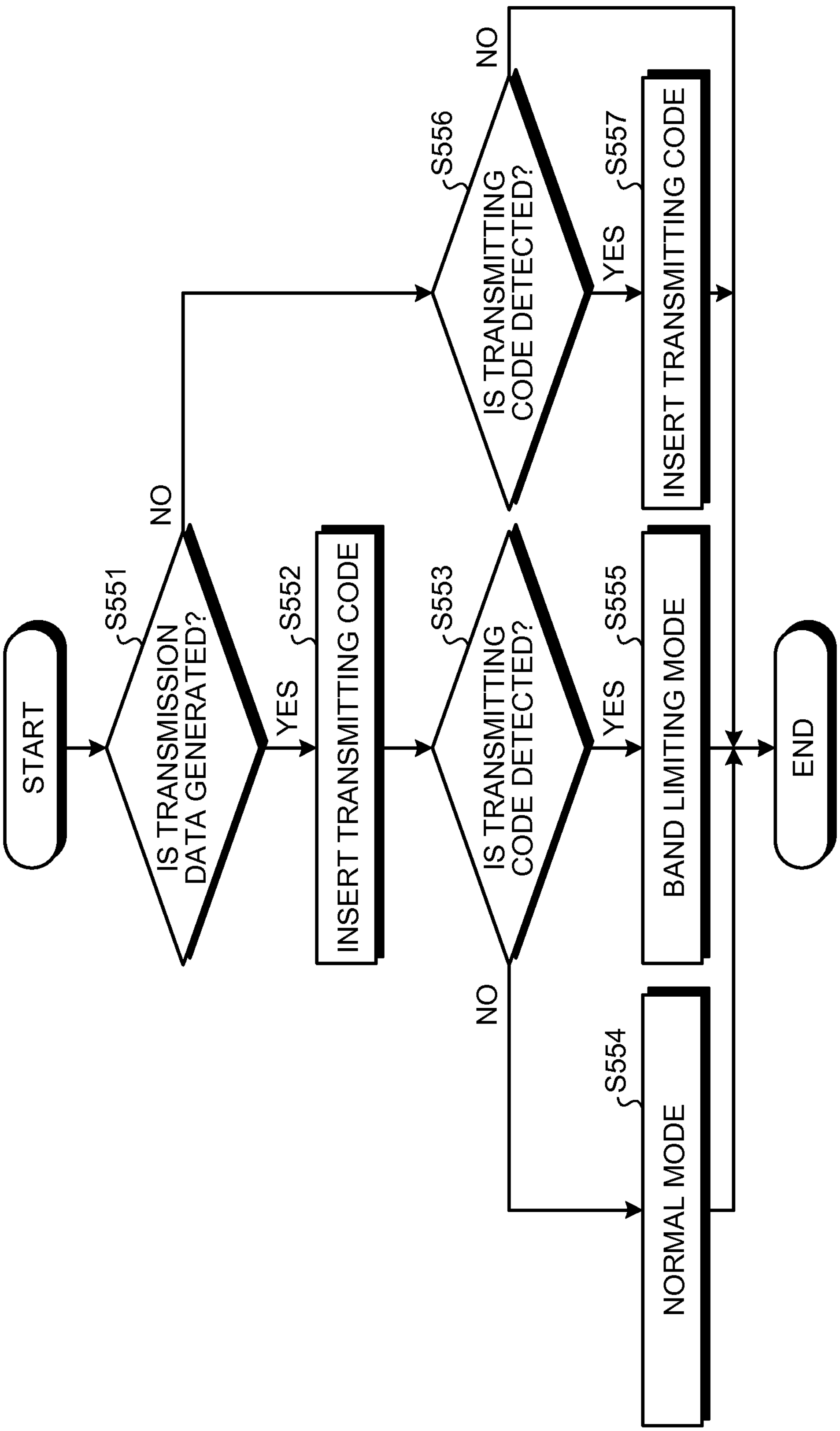
FIG. 19 is a flowchart of an operation performed by an RRH-equipped base station device according to the fifth embodiment.

An operation performed by the RRH-equipped base station device 100-2 corresponding to the higher-level device between the RRH-equipped base station devices 100-2 and 100-3 will now be described with reference to a flowchart depicted in FIG. 19. In the following, an operation of inserting a transmitting code into downlink data will be mainly described.

In the present embodiment, the transmission determining unit 501 monitors the transmission buffer 121*a* of the uplink transmission-reception buffer unit 121, and determines whether transmission data newly transmitted from the RRH-equipped base station device 100-2 is generated (Step S551). In other words, the transmission determining unit 501 determines whether an uplink frame including report data for reporting the state of the RRH-equipped base station device 100-2, data transmitted from the mobile terminal 20-2 under the charge of the RRH-equipped base station device 100-2, and the like, is stored in the transmission buffer 121*a*.

As a result of the determination, if the uplink frame is stored in the transmission buffer 121*a* (YES at Step S551), the transmitting code inserting unit 502 inserts a transmitting code into idle sections of the downlink data and the uplink data (Step S552). The transmitting code detecting unit 503 judges whether the transmitting code is inserted into the idle sections of the uplink data or the downlink data received by the RRH-equipped base station device 100-2 (Step S553), and determines a mode for transmitting the uplink frame.

In other words, if the transmitting code is not detected from the idle section of the uplink data or the downlink data (NO at Step S553), it is judged that an RRH-equipped base station device other than the RRH-equipped base station device 100-2 does not transmit a new uplink frame. Accordingly, the uplink transmission controlling unit 504 is operated in a normal mode (Step S554). Consequently, the uplink frame stored in the transmission buffer 121*a* is not distinguished from the uplink frame stored in the reception buffer 121*b*, and the uplink transmission controlling unit 504 allocates the uplink frames to the frame sections of the uplink data, in the order that the uplink frames were stored in the buffers.

If the transmitting code is detected from the idle section of the uplink data or the downlink data (YES at Step S553), it is judged that an RRH-equipped base station device other than the RRH-equipped base station device 100-2 transmits a new uplink frame. Accordingly, the uplink transmission controlling unit 504 is operated in a band limiting mode (Step S555). Consequently, the uplink transmission controlling unit 504 allocates the uplink frame stored in the transmission buffer 121*a* to the frame section of the uplink data assigned to the RRH-equipped base station device 100-2.

As a result of the determination by the transmission determining unit 501, if the uplink frame is not stored in the transmission buffer 121*a* (NO at Step S551), the transmitting code detecting unit 503 judges whether a transmitting code is inserted into the idle section of the uplink data or the downlink data received by the RRH-equipped base station device 100-2 (Step S556). If the transmitting code is detected from the uplink data (YES at Step S556), the transmitting code inserting unit 502 inserts the transmitting code into an idle section of uplink data transmitted from the RRH-equipped base station device 100-2 (Step S557). Similarly, if the transmitting code is detected from the downlink data (YES at Step S556), the transmitting code inserting unit 502 inserts the transmitting code into an idle section of downlink data transmitted from the RRH-equipped base station device 100-2 (Step S557).

In this manner, when the transmitting code is inserted into the uplink data or the downlink data received by the RRH-equipped base station device 100-2, the transmitting code is also inserted into uplink data or downlink data transmitted from the RRH-equipped base station device 100-2, and the transmitting code is transferred to the higher-level device or the lower-level device. Accordingly, if transmission data is generated in one of the RRH-equipped base station devices in the communication system, the transmitting code is transferred to all the RRH-equipped base station devices.

In this manner, according to the present embodiment, upon transmitting a new uplink frame from the RRH-equipped base station device, the RRH-equipped base station device inserts a transmitting code into downlink data and uplink data, and transmits the transmitting code. If the RRH-equipped base station device receives the transmitting code from the other RRH-equipped base station device, the RRH-equipped base station device moves to a band limiting mode, and allocates an uplink frame newly transmitted from the RRH-equipped base station device, to the frame section assigned to the RRH-equipped base station device. Accordingly, if one RRH-equipped base station device transmits a new uplink frame, this RRH-equipped base station device can utilize the uplink band to a maximum. If two or more RRH-equipped base station devices transmit a new uplink frame, each of the RRH-equipped base station devices transmits the uplink frame by limiting the transmission band. Consequently, it is possible to avoid insufficient uplink band.

[f] Sixth Embodiment

In the first to the fifth embodiments, all the RRH-equipped base station devices connected in cascade limit the transmission of an uplink frame, based on a transmission control code inserted into the idle section. However, for example, when RRH-equipped base station devices are arranged along a narrow area such as a highway, a part of the RRH-equipped base station devices may not correspond to the transmission control code inserted into the idle section. In a sixth embodiment, a process of confirming whether the higher-level device and the lower-level device adjacent to the RRH-equipped base station device can be operated based on the transmission control code inserted into the idle section will be described.

In other words, in the sixth embodiment, a correspondence code for confirming whether a process based on a transmission control code can be performed is transmitted to an RRH-equipped base station device adjacent to the RRH-equipped base station device, and upon receiving the response for the correspondence code, a process of inserting a transmission control code into the idle section is executed.

Because a configuration of a communication system according to the present embodiment is the same as that of the communication system (FIG. 1) according to the first embodiment, the descriptions thereof are omitted.

Configuration of RRH-Equipped Base Station Device

Configurations of these RRH-equipped base station devices 100-1 and 100-2 according to the present embodiment are substantially the same as the configurations of the RRH-equipped base station devices 100-1 and 100-2 (FIG. 2) according to the first embodiment. However, inner configurations of the frame processing units 120-1 and 120-2 of the present embodiment are different from those of the first embodiment. Accordingly, in the following, the configurations of the frame processing units 120-1 and 120-2 according to the present embodiment will be described.

Figure 20:
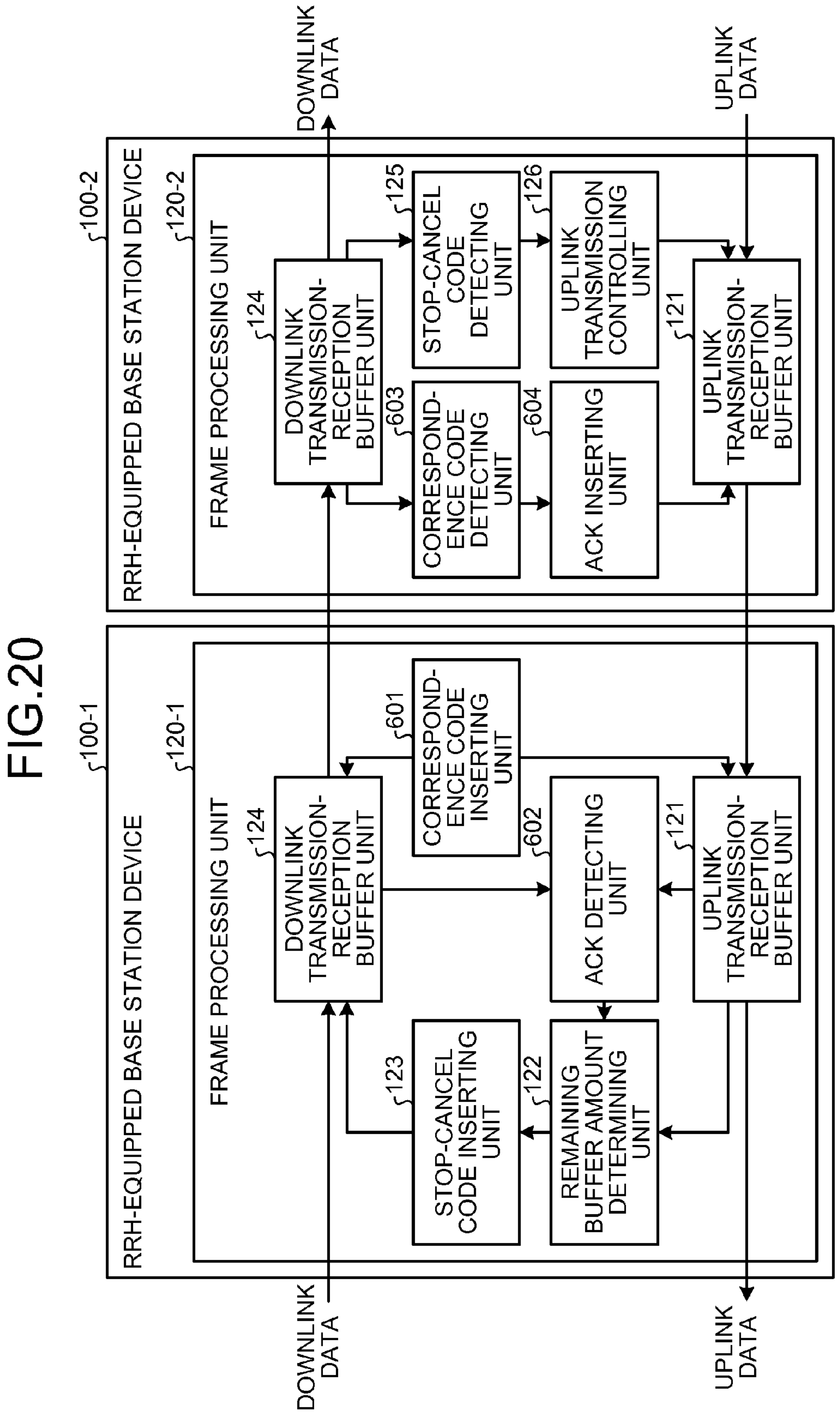
FIG. 20 is a schematic of frame processing units according to a sixth embodiment.

FIG. 20 is a schematic of the frame processing units 120-1 and 120-2 according to the present embodiment. In FIG. 20, the higher-level communication units 110-1 and 110-2, the lower-level communication units 130-1 and 130-2, and the radio communication units 140-1 and 140-2 are not depicted. Portions the same as those in FIG. 2 are denoted by the same reference numerals, and the descriptions thereof are omitted. The frame processing unit 120-1 depicted in FIG. 20 includes the uplink transmission-reception buffer unit 121, the remaining buffer amount determining unit 122, the stop-cancel code inserting unit 123, the downlink transmission-reception buffer unit 124, a correspondence code inserting unit 601, and an acknowledgment (ACK) detecting unit 602.

The correspondence code inserting unit 601 inserts a correspondence code for confirming whether the adjacent RRH-equipped base station device can perform the process corresponding to a transmission control code, into idle sections of the downlink data and uplink data transmitted from the RRH-equipped base station device 100-1. The correspondence code inserting unit 601 may insert a correspondence code during the initialization of the entire communication system or the RRH-equipped base station device 100-1, or may insert a correspondence code at any time while the RRH-equipped base station device is operating.

When the downlink data and uplink data in which a correspondence code is inserted are transmitted, the ACK detecting unit 602 detects an ACK for the correspondence code in the uplink data and the downlink data. In other words, the ACK detecting unit 602, when a correspondence code is inserted into downlink data, if the lower-level device can correspond to the transmission control code inserted into the idle section, detects the ACK from the uplink data. Similarly, the ACK detecting unit 602, when a correspondence code is inserted into uplink data, if the higher-level device can correspond to the transmission control code inserted into the idle section, detects the ACK from the downlink data.

The frame processing unit 120-2 depicted in FIG. 20 includes the uplink transmission-reception buffer unit 121, the downlink transmission-reception buffer unit 124, the stop-cancel code detecting unit 125, the uplink transmission controlling unit 126, a correspondence code detecting unit 603, and an ACK inserting unit 604.

The correspondence code detecting unit 603 monitors the idle section of the downlink data received by the downlink transmission-reception buffer unit 124, and detects a correspondence code in the idle section. The correspondence code detecting unit 603, upon detecting the correspondence code, notifies the ACK inserting unit 604 accordingly.

The ACK inserting unit 604, upon being notified that the correspondence code is detected by the correspondence code detecting unit 603, inserts an ACK into the idle section of uplink data.

Method for Communicating Uplink Data

Figure 21:
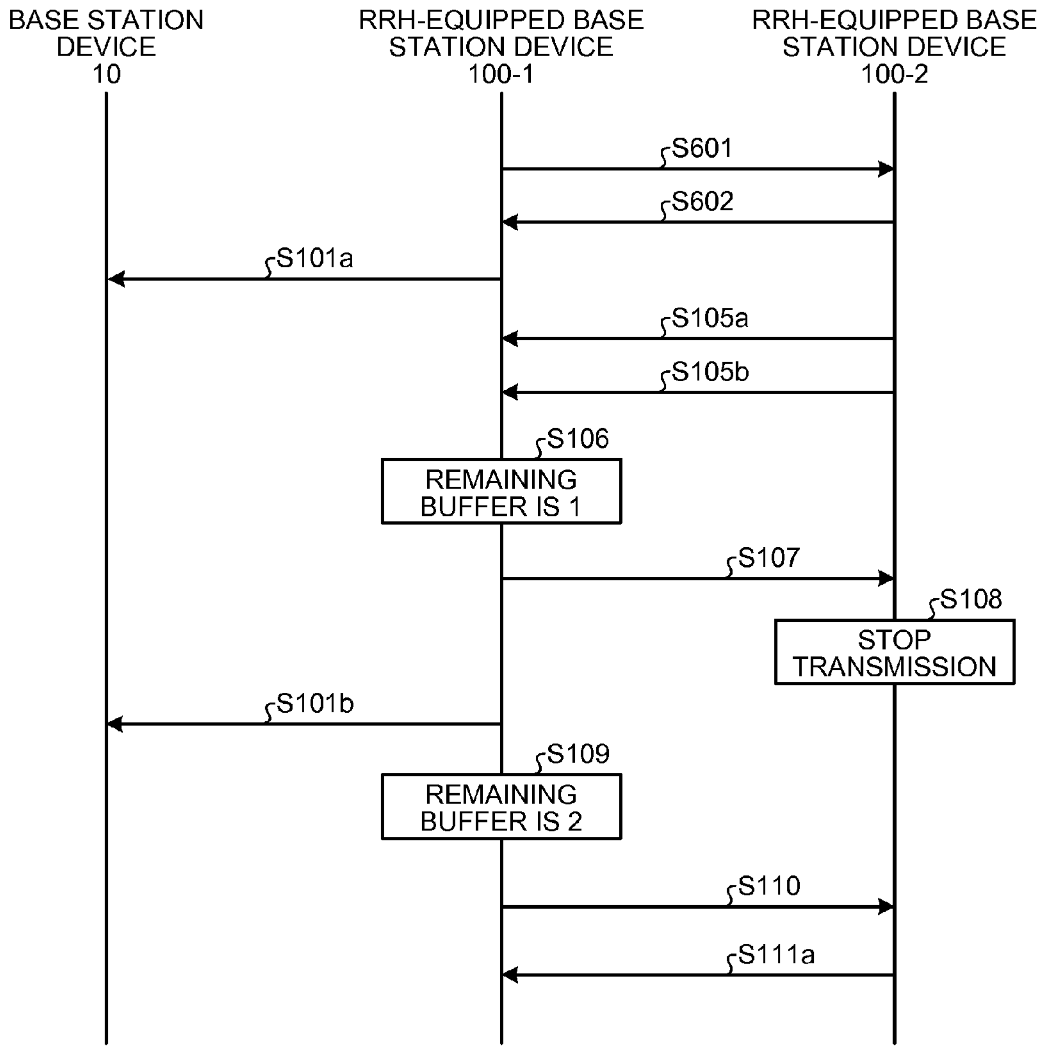
FIG. 21 is a sequence diagram of a method for communicating uplink data according to the sixth embodiment.

A method for communicating uplink data transmitted to the base station device 10 from the RRH-equipped base station device 100-2 according to the present embodiment will now be described with reference to a sequence diagram depicted in FIG. 21. In FIG. 21, portions the same as those in FIG. 5 are denoted by the same reference numerals, and the detailed descriptions thereof are omitted.

Upon initializing the RRH-equipped base station device 100-1, the correspondence code inserting unit 601 inserts a correspondence code into downlink data, and the downlink data including the correspondence code is transmitted to the RRH-equipped base station device 100-2 (Step S601). In the RRH-equipped base station device 100-2, the correspondence code detecting unit 603 detects the correspondence code, and the ACK inserting unit 604 inserts an ACK into uplink data. The uplink data including the ACK is transmitted to the RRH-equipped base station device 100-1 (Step S602). In the RRH-equipped base station device 100-1, the ACK detecting unit 602 detects the ACK, and it is confirmed that the RRH-equipped base station device 100-2 can correspond to the transmission control code inserted into the idle section.

Although not mentioned here, uplink data including a correspondence code may also be transmitted from the RRH-equipped base station device 100-2, and the RRH-equipped base station device 100-1 may return the ACK corresponding to the correspondence code. In other words, the correspondence code and the ACK may be exchanged between the adjacent RRH-equipped base station devices. The correspondence code and the ACK may be exchanged not only during the initialization, but at any time by using the idle section.

Upon exchanging the correspondence code and the ACK, the RRH-equipped base station device 100-1 starts transmitting an uplink frame to the base station device 10 (Step S101*a*). The RRH-equipped base station device 100-2 also starts transmitting an uplink frame to the RRH-equipped base station device 100-1 (Step S105*a*), thereby completing the transmission of the uplink frame (Step S105*b*). In the present embodiment, at this point, the remaining number of reception buffers is one (Step S106).

Here, the ACK is detected by the ACK detecting unit 602, and it is confirmed that the RRH-equipped base station device 100-2 can correspond to the stop code inserted into the idle section. Accordingly, the ACK detecting unit 602 instructs the remaining buffer amount determining unit 122 to determine whether the number of empty reception buffers is equal to or less than one. Consequently, the remaining buffer amount determining unit 122 determines that the number of empty reception buffers is equal to or less than one. As a result, a stop code is inserted into downlink data, thereby transmitting the stop code (Step S107).

If the ACK is not detected by the ACK detecting unit 602, it is considered that the RRH-equipped base station device 100-2 is unable to correspond to the stop code inserted into the idle section. Accordingly, a process of inserting a stop code into downlink data will be wasteful. Consequently, if the ACK is not detected by the ACK detecting unit 602, the remaining buffer amount determining unit 122 does not determine whether the number of empty reception buffers is equal to or less than one.

As a result, it is possible to eliminate a wasteful process performed in the RRH-equipped base station device 100-1, when the lower-level device is unable to correspond to the stop code.

If the RRH-equipped base station device 100-1 transmits the downlink data into which a stop code is inserted, like in the first embodiment, the uplink transmission controlling unit 126 stops transmitting uplink frames to the RRH-equipped base station device 100-1 (Step S108). If the transmission of the uplink frame that started first has completed (Step S101*b*), the number of empty reception buffers in the RRH-equipped base station device 100-1 is two (Step S109). Accordingly, the stop-cancel code inserting unit 123 inserts a cancel code into an idle section of downlink data, and the downlink data including the cancel code is transmitted to the RRH-equipped base station device 100-2 (Step S110). The uplink transmission controlling unit 126 then resumes transmitting uplink frames to the RRH-equipped base station device 100-1 (Step S111*a*). A cancel code is also inserted, when the ACK for the correspondence code is returned from the RRH-equipped base station device 100-2.

In this manner, according to the present embodiment, whether the adjacent RRH-equipped base station device can correspond to the transmission control code inserted into the idle section is confirmed, by exchanging the correspondence code and the ACK for the correspondence code. Accordingly, for example, if the adjacent RRH-equipped base station devices are replaced, it is possible to prevent a wasteful process of transmitting a transmission control code such as a stop code to an RRH-equipped base station device that is unable to correspond to the transmission control code inserted into the idle section from occurring.

In the first to the fourth embodiments, if the number of empty reception buffers is equal to or less than one, a transmission control code is inserted into downlink data. However, the number of empty reception buffers that is a threshold may be changed. In other words, for example, a transmission control code may be inserted if the number of empty reception buffers is equal to or less than two. If the reception buffer in the uplink transmission-reception buffer unit 121 is not divided into a plurality of reception buffers 121*b*, the timing to insert a transmission control code may be determined, from a ratio of empty capacity of the reception buffer, and the like. Similarly, conditions related to the empty capacity of the reception buffer used to insert a cancel code into downlink data and to stop inserting a transmission control code may be changed in various ways.

In the fifth embodiment, if the number of RRH-equipped base station devices that transmits a new uplink frame is equal to or more than two, the RRH-equipped base station devices move to a band limiting mode. However, the RRH-equipped base station devices do not necessary have to move to a band limiting mode, if two RRH-equipped base station devices transmit new uplink frames. In other words, for example, the RRH-equipped base station devices may move to a band limiting mode if three or more RRH-equipped base station devices transmit new uplink frames. Needless to say, the RRH-equipped base station devices may move to a band limiting mode if four or more RRH-equipped base station devices transmit new uplink frames. In such cases, for example, the number of RRH-equipped base station devices that transmit new uplink frames among the RRH-equipped base station devices may be recognized, by setting a transmitting code as a unique code for each of the RRH-equipped base station devices.

The fifth embodiment may also be performed by combining with the first to the fourth embodiments. In other words, not only moving to the band limiting mode by the number of RRH-equipped base station devices that transmit new uplink frames, but the transmission of the uplink frame from the RRH-equipped base station devices can be controlled, by also considering the empty capacity of the reception buffer in each of the RRH-equipped base station devices. In this manner, the uplink frame can be transmitted without fail, within the range of the uplink band.

In the band limiting mode in the fourth and the fifth embodiments, uplink frames newly transmitted from the RRH-equipped base station devices are allocated to the frame sections equally assigned to all the RRH-equipped base station devices. However, during a band limiting mode, new uplink frames may not be transmitted from all the RRH-equipped base station devices constantly. Accordingly, in a band limiting mode, the transmission of a new uplink frame may be notified among the RRH-equipped base station devices, and the frame sections assigned to the RRH-equipped base station devices may be dynamically changed, by inserting a code besides the limit code into the idle section.

In other words, for example, if two RRH-equipped base station devices transmit new uplink frames, the entire uplink band is divided into two, and the band divided into two may be assigned to the RRH-equipped base station devices. Similarly, if three or more RRH-equipped base station devices transmit new uplink frames, the entire uplink band may be equally divided, and the equally divided band may be assigned to each of the RRH-equipped base station devices. In this manner, even if the RRH-equipped base station device moves in a band limiting mode, it is possible to utilize the uplink band to a maximum. The exchange between the RRH-equipped base station devices required for the process may be executed, by inserting a code into the idle section.

In the second to the sixth embodiments, a specific form of the transmission control code is not mentioned. However, various transmission control codes according to the second to the sixth embodiments may be the codes formed similarly to the stop code and cancel code according to the first embodiment. In other words, for example, if the 4B/5B format is used, one of the invalid codes may be defined as a transmission control code such as a request code, a limit code, a transmitting code, and a correspondence code.

In the sixth embodiment, the exchange between the correspondence code and the ACK is combined with the first embodiment. However, the exchange between the correspondence code and the ACK may be combined with the second to the fifth embodiments.

In the first to the sixth embodiments, various transmission control codes are inserted into the idle section. For example, a data format defined by the CPRI has an idle section. Accordingly, even if the RRH-equipped base station device according to the embodiments meets the CPRI specification, the similar effects to those of the embodiments can be obtained.

Figure 22:
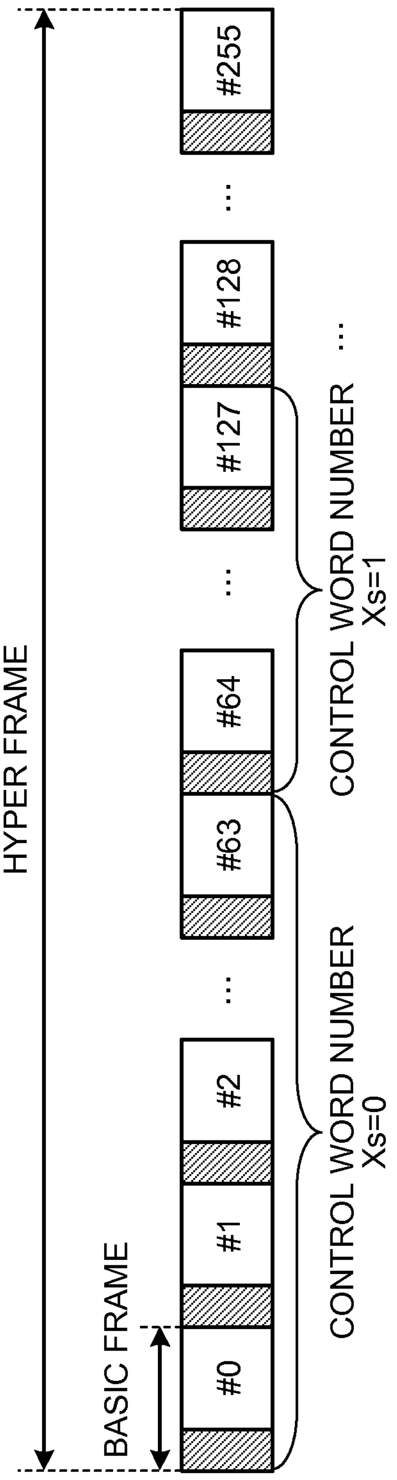
FIG. 22 is a schematic of an example of a physical frame format.

In the CPRI, a physical frame in a physical layer is specified by the format depicted in FIG. 22. In other words, one hyper frame includes 256 basic frames, and a control signal called a control word is arranged in a shaded region at the top of each of the basic frames in FIG. 22. Sixty-four control words of the basic frames form one unit, and one hyper frame includes four units of control words having control word numbers from 0 to 3. The four control words corresponding to each unit each have a sub-channel, and the contents of the sub-channels are as depicted in FIG. 23.

Various transmission control codes described in the first to the sixth embodiments, for example, may be mapped to a "fast control and management (C&M)" area of the p-th to the 63rd sub-channels corresponding to a pointer p among the sub-channels depicted in FIG. 23. The transmission control code may also be mapped to a "reserved" area of the third to the fifteenth sub-channels, and to a "vendor specific" area of the 16th to the p-1st sub-channels.

<Note>

The embodiments discussed above further disclose Notes which follow.

(Note 1) A communication system comprising: a first communication device; and a second communication device, the first communication device and the second communication device transmitting and receiving data having a data section with information and an idle section without information, the first communication device comprising: a determining unit that determines whether a remaining amount of a buffer for storing therein information included in reception data is equal to or less than a predetermined amount; an inserting unit that, when the determining unit determines that the remaining amount of the buffer is equal to or less than the predetermined amount, inserts a transmission control signal for controlling data transmission performed by the second communication device into an idle section of data transmitted to the second communication device; and a transmitting unit that transmits data into which the transmission control signal is inserted by the inserting unit to the second communication device, and the second communication device comprising: a receiving unit that receives data transmitted by the transmitting unit; a detecting unit that detects the transmission control signal in the idle section of the data received by the receiving unit; and a controlling unit that controls the data transmission based on the transmission control signal detected by the detecting unit.

(Note 2) A communication system comprising: a first communication device; and a second communication device, the first communication device and the second communication device transmitting and receiving data having a data section with information and an idle section without information, the first communication device comprising: a determining unit that determines whether transmission information is newly transmitted from the first communication device; an inserting unit that, when the determining unit determines that the transmission information is present, inserts a transmission control signal for controlling data transmission performed by the second communication device into an idle section of data transmitted to the second communication device; and a transmitting unit that transmits the data into which the transmission control signal is inserted by the inserting unit to the second communication device, and the second communication device comprising: a receiving unit that receives the data transmitted by the transmitting unit; a detecting unit that detects the transmission control signal in the idle section of the data received by the receiving unit; and a controlling unit that controls the data transmission based on the transmission control signal detected by the detecting unit.

(Note 3) A communication apparatus comprising: a receiving unit that receives data including a data section with information and an idle section without information; a detecting unit that detects a transmission control signal for controlling data transmission in the communication apparatus in the idle section of the data received by the receiving unit; and a controlling unit that controls the data transmission based on the transmission control signal detected by the detecting unit.

In one aspect of the method for controlling communication, the communication system, and the communication apparatus disclosed in the present application, it is possible to effectively use a band in a communication line to which a plurality of communication apparatuses is connected in cascade.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for controlling communication comprising:

determining in which a first communication device refers to a buffer including a transmission buffer retaining a transmission frame transmitted from the first communication device and a reception buffer retaining a reception frame received from a second communication device, and determines whether a remaining amount of the reception buffer is equal to or less than a predetermined amount;

inserting, during a period in which the remaining amount of the reception buffer is determined to be equal to or less than the predetermined amount, a transmission control signal for stopping transmission performed by the second communication device into all idle sections of data transmitted to the second communication device, the data including a data section with information and the idle section without information;

transmitting the data into which the transmission control signal is inserted to the second communication device;

receiving in which the second communication device receives the data including the data section and the idle section; and controlling including stopping the data transmission while the transmission control signal is detected from the received data, and resuming the data transmission when the transmission control signal is not detected from the received data.

2. The method according to claim 1, further comprising:

priority determining in which the second communication device determines whether priority information transferred to a third communication device through the first communication device and whose transmission delay is not allowed is transmitted from the second communication device;

requesting, upon being determined that the priority information is transmitted from the second communication device, to transmit a transmission control signal for requesting transmission of the priority information prior to other information to the first communication device; and waiting in which the first communication device stops transmitting information in a data section of data transmitted to the third communication device, from when the transmission control signal transmitted at the requesting is detected, until when the priority information transmitted from the second communication device is received.

3. The method according to claim 1, further comprising:

confirming in which the first communication device inserts a confirming signal for confirming whether control corresponding to a transmission control signal inserted into the idle section of the data is executable, into the idle section of the data transmitted to the second communication device, and transmits the confirming signal, wherein upon receiving a response for the confirming signal transmitted from the second communication device, a transmission control signal is inserted into the idle section of the data transmitted to the second communication device.

4. The method according to claim 1, wherein the determining includes determining whether a transmission frame newly transmitted from the first communication device is retained in the transmission buffer; and the inserting includes inserting, upon being determined that the transmission frame is retained in the transmission buffer, a transmission control signal for limiting a transmission band of the second communication device into an idle section of data transmitted to the second communication device.

5. The method according to claim 4, further comprising:

monitoring in which the first communication device monitors whether a transmission control signal for limiting a transmission band of information in the data section is received; and band limiting, upon receiving the transmission control signal, a transmission band of information in a data section of data transmitted to a third communication device.

6. A communication apparatus comprising:

a buffer that includes a transmission buffer retaining a transmission frame transmitted from the communication apparatus and a reception buffer retaining a reception frame received from another communication apparatus connected to the communication apparatus;

a determining unit that refers to the buffer and determines whether a remaining amount of the reception buffer is equal to or less than a predetermined amount;

an inserting unit that keeps inserting, during a period in which the determining unit determines that the remaining amount of the reception buffer is equal to or less than the predetermined amount, a transmission control signal for stopping transmission performed by the other communication apparatus into all idle sections without information provided in data; and a transmitting unit that transmits data into which the transmission control signal is inserted to the other communication apparatus.

* * * * *